United States Patent [19]
Hatano et al.

[11] Patent Number: 5,485,533
[45] Date of Patent: Jan. 16, 1996

[54] METHOD AND APPARATUS FOR ENCODING VIDEO SIGNALS IN 3-D BLOCKS WITHOUT DETECTING IMAGE MOTION

[75] Inventors: Yoshiko Hatano; Ken Onishi; Yoshinori Asamura; Takashi Itou; Manabu Tsukamoto, all of Nagaokakyo, Japan

[73] Assignee: Mitsubishi Denki Kabushiki Kaisha, Tokyo, Japan

[21] Appl. No.: 41,883

[22] Filed: Apr. 2, 1993

Related U.S. Application Data

[63] Continuation of Ser. No. 712,714, Jun. 10, 1991, abandoned.

[30] Foreign Application Priority Data

Jun. 13, 1990 [JP] Japan ................................ 2-156453
Mar. 12, 1991 [JP] Japan ................................ 3-046872
May 15, 1991 [JP] Japan ................................ 3-110028

[51] Int. Cl.[6] ........................... G06K 9/36; H04N 7/12
[52] U.S. Cl. ........................ 382/236; 382/250; 348/420
[58] Field of Search ................... 382/56, 236, 250; 358/133, 135, 136; 348/403, 420; H04N 7/12

[56] References Cited

U.S. PATENT DOCUMENTS

| | | | |
|---|---|---|---|
| 4,394,774 | 7/1983 | Widergren et al. | 382/56 |
| 4,468,688 | 8/1984 | Gabriel et al. | 358/22 |
| 4,691,329 | 9/1987 | Juri et al. | 375/122 |
| 4,704,628 | 11/1987 | Chen et al. | 358/136 |
| 4,933,763 | 6/1990 | Chantelou | 358/136 |
| 5,081,532 | 1/1992 | Rabii | 358/105 |
| 5,126,962 | 6/1992 | Chiang | 364/725 |

FOREIGN PATENT DOCUMENTS 1-253382 10/1989 Japan .
2-072720 3/1990 Japan ................................ H03M 7/30

OTHER PUBLICATIONS

Nadas, "Compression of Video Data via Three-Dimensional Bandwidth Reduction," *IBM Technical Disclosure Bulletin*, vol. 19, No. 11, Apr. 1977, pp. 4207–4210.

Signal Processing of HDTV: Apr. 24, 1984 "Proceedings of the Second International Workshop on Signal Processing of HDTV". Chantelou et al. (Feb. 29–Mar. 2, 1988), pp. 231–238.

Fernseh & Kino Technik "Digitaler Video–Normwandler" Richards et al. (Feb. 1988), pp. 60–64.

"Digital Picture Representation and Compression", pp. 441–443, Netravali et al., (date unknown).

IEEE Transaction on Communications "On Interframe Transform Coding", Natarajan et al. vol. COM–25, No. 11, Nov. 1977, pp. 1323–1329.

*Primary Examiner*—Leo H. Boudreau
*Assistant Examiner*—Andrew W. Johns

[57] ABSTRACT

A coding method and apparatus is for coding a digital video signal of interlaced type. Three-dimensional (horizontal, vertical and temporal directions) blocks are constructed for each of a plurality of picture elements, orthogonal transform is performed to each of the three-dimensional blocks and coefficients are coded. Coefficients non-effected by a pseudo-moving part are weighted with a low rate, and coefficients effected by a pseudo-moving part are weighted with high rate. After the vertical positions of picture elements of odd-number fields and those of even-number fields are coincided with each other by an intra-field picture element operation, the digital video signal is formatted and three-dimensional orthogonal transform is performed.

17 Claims, 21 Drawing Sheets

MOVING PICTURE

STILL PICTURE

IN CODING

IN DECODING

IN CODING

IN DECODING

IN CODING

IN DECODING

METHOD AND APPARATUS FOR ENCODING VIDEO SIGNALS IN 3-D BLOCKS WITHOUT DETECTING IMAGE MOTION

This application is a continuation of application Ser. No. 07/712,714, filed on Jun. 10, 1991, now abandoned.

BACKGROUND OF THE INVENTION

1. Field of the Invention

This invention relates to a coding method and coding apparatus for coding a digital video signal by reducing it.

2. Description of Related Art

Some conventional methods of coding digital video signals are disclosed in Japanese Patent Application Laid-Open No. 1-253382 (1989) and U.S. Pat. No. 4,394,774. The following explanation will be given referring to these conventional methods.

Transmitting or recording digital video signals can reduce channel noise or reading noise quality of a displayed image, and these digital signals are easily transmitted by a digital network of a telephone type. In spite of this, digitization of the sequence of a television image is carried out at such a high speed that digitized color television signals cannot generally be directly transmitted or recorded generally by an existing carrier. According to a notice 601 by CCIR, the digitization rate of color television signals is 216 Mbtis/s. Therefore, in order to apply the digitized color television signal to actual transmitting speed and recording speed, it is important to reduce the digitization rate.

In U.S. Pat. No. 4,394,774, a method of reducing the digitization rate to a factor 10 to 20, that is, 1/10 to 1/20 is mentioned. The method, based upon orthogonal transform, can compress redundancy by using the redundancy of neighboring picture elements in the image. This method is characterized by performing orthogonal transform, which decorrelates picture elements of a block by dividing an image into blocks of the same size and concentrating energy to small number of picture elements.

In order to gain equivalent information reduction from image-to image redundancy existing in a still part of an image, this method is often combined with an image-to image prediction technique.

According to this technique, either a block itself is transmitted (intra-frame mode) or a difference between this block and a block with a same spatial position as a preceding image after coding/decoding is transmitted (inter-frame mode). Accordingly a block with a minimum energy is transmitted.

If this image-to-image prediction introduces time-recursivity of coding, in other words, if the decoded preceding image can be used, only decoding of the image signal with the usual reproducing mode is possible by the prediction. This is characterized such that errors existing in receiving video signals or in reading a band are to exist in various images. In fact, there is a danger that various errors appear in an image as long as the block in which this error appears is coded with an inter-frame mode.

Moreover, the recursivity is not compatible with a consumer's video recording, that is, a home video recording. Because a random access to an image is excepted, this random access is necessary to realize a "quick search mode". Sometimes, to improve on the fault one image among N images is coded with intra-frame mode. However, as this method degrades quality of a displayed image, the number N should be large so that the degradation may be restricted, resulting in the limited improvement.

Japanese Patent Application Laid-Open No. 1-253382 (1989) provides a method of coding a video signal by which the video signal can be coded by image-to-image correlation without introducing the image-to-image recursivity. That is, this official report provides a method which is compatible with a consumer's video recording and is not sensitive to channel error.

In order to realize the coding method, the coding apparatus is provided with the following steps;

(a) a preliminary step which is an estimation of a principal movement from one image to another for relating a displacement vector to each image concerning a preceding image, the principal vector being a vector whose image-to-image difference is minimum, (b) a preliminary step which is a scan conversion for prescribing a form of three-dimensional (3-D) block, by dividing a sequence of video signals corresponding to image into groups, each of which corresponds to N continuous images, and by prescribing a three dimensional group including M lines and P picture elements in every line in an image plane of a group on one hand and in N continuous planes corresponding to N images of a group on the other hand, N two-dimensional blocks with M lines and P picture elements which compose each three-dimensional block of a same group being spatially shifted from one image to another by a displacement vector which has been estimated regarding each image.

The method gives a possibility of using a temporal redundancy of a signal, thanks to decorrelation realized by orthogonal transform of a still part of an image without substantial displacement. This method can be applied to the case of a sight or a general movement of a camera and even to the case where the movement effects almost all the parts of the sight. In the last two cases, this method is superior to that which uses an inter-frame mode and an intra-frame mode. Because it uses inter-frame correlation and at the same time uses the inter-frame/intra-frame process, it does not take these displacements into consideration. Moreover, as the effect is limited to N images, this process does not introduce any image-to-image recursivity at the time of coding, ensuring compatibility of satisfying immunity to noise with a "quick search mode" provided in a video recorder.

If the decrease of speed of a video signal in a non-interlaced image form is used, this process is especially effective. If a usable signal is interlaced, the form thereof is converted before coding, leading to the production of a non-interlaced video signal. Accordingly, as shown in FIG. 1, each image is composed of each frame, and a three-dimensional block is composed by taking a one-dimensional direction in the horizontal direction, a two-dimensional direction in the vertical direction, and a three dimensional direction in the temporal direction, reducing a redundant component of an image signal by orthogonal transform.

However, in an actual television screen, an interlaced scanning form is adopted, as shown in FIG. 2. In transmitting data of a moving picture, this method is profitable for preventing flickering without increasing information content to be transmitted. Therefore, the scanning of one screen is finished with half the number of scanning lines as is shown in FIG 2. At the next screen, a reduction of vertical resolution of an image is restricted by scanning lines which were not scanned in a previous screen. By this interlaced scanning form, as the number of screens transmitted at the same time becomes double that at the time of sequential scanning, generation of flickers is restricted. This roughly scanned screen is called a field, and two continuous fields form a frame, as shown in FIG. 3, the scanning rate being 60 fields by the NTSC (National Television System Committee) method.

According to a conventional coding method, as a three-dimensional block is composed by a non-interlaced signal, redundancy of an image signal could not always be reduced effectively as compared to interlaced image signal. Especially, when an interlaced image signal which has a great deal of motion is made non-interlaced form, effective decreasing of redundancy of an image signal cannot be obtained as in two-dimension, wherein spatial displacement and time displacement are mixed.

By the way, in the case of coding a digital video signal in an interlaced scanning form, spatial displacement in adjacent interfields is converted to time displacement due to the effect of the interlaced scanning form, and the pseudo part appears even, in the case of a complete still picture. Accordingly, when weighting and quantizing is performed on a high coefficient after orthogonal transform is carried out in the temporal direction in order to reduce information content at the time of the moving picture, the weighting and quantizing is also carried out in the pseude-moving part, resulting in deterioration of image quality of a still picture at the decoding side. In order to solve these problems, it is necessary to judge whether the picture is moving or still on every 3-D block and to perform weighting and quantizing of different levels corresponding to a moving picture or a still picture.

SUMMARY OF THE INVENTION

One object of the present invention is to provide a coding method and a coding apparatus capable of effectively reducing redundancy of a video signal in interlaced scanning form.

Another object of the invention is to provide a coding method and a coding apparatus capable of reducing information content at the time of the moving picture without judging whether the picture is moving or still.

Still another object of the invention is to provide a coding method and a coding apparatus capable of reducing information content at the time of the moving picture without deterioration of image quality of a still picture at a decoding side.

A further object of the invention is to provide a coding method and a coding apparatus capable of more effectively reducing redundancy of video signals in interlaced scanning form by making spatial positions of picture elements in odd-number fields and those in even-number fields coincide with each other.

In one coding method of the invention, as to video signals in interlaced scanning form, a two-dimensional block is composed in each field, and the odd-number and the even-number fields are bundled in temporal direction to compose a three-dimensional block in every spatially adjacent picture element, and coding is performed by orthogonal transform on every 3-D block. When compared with a conventional example, it has a more accurate signal composition in the temporal direction, being capable of reducing video signal.

In another coding method of the invention, quantizing is performed after weighting, on a coefficient by which a pseudo-moving part due to the effect of interlaced scanning does not appear, and quantizing is performed intact on a coefficient by which the pseudo-moving part appears. At this time, in the case of still picture, as weighting is performed on a coefficient whose value is originally zero, data is not lost at all. Further, there is no deterioration in image quality of still picture at the decoding side. On the other hand, in the case of a moving picture, as the coefficient is converted into zero or a small number by weighting, the information content is reduced.

In still another coding method of the invention, weighting at a lower rate and rougher quantizing are performed on a coefficient by which a pseudo moving part does not appear, than on a coefficient in which pseudo moving part appears due to an effect of interlaced scanning. At this time, in the case of a still picture, as the weighting at a lower rate is performed a coefficient whose value is originally zero, degree of information reduction is small as a whole. On the other hand, in the case of a moving picture, as the coefficient is converted into zero or a small number by weighting at a lower rate, the information content is reduced largely.

In a further coding method of the invention, as to a digital video signal in interlaced scanning form, after the positions of picture elements in odd-fields and those in even-fields are coincided with each other in the vertical direction by performing intra-field picture elements calculation, operations such as orthogonal transform and filtering are performed on picture elements of a plurality of fields. Concretely, after the positions of picture elements in odd-number fields and those in even-number fields are coincided with each other in a vertical direction, a three-dimensional block comprising of a horizontal direction, vertical direction and temporal direction is composed with every plurality of the picture elements, three-dimensional orthogonal transform being performed on the three-dimensional block. As the positions of the picture elements in odd-number fields and those in even-number fields are coincided with each other in two-dimensional space, the signal composition becomes more accurate to a temporal direction, thereby larger information reduction is accomplished by interfield picture elements calculation. The above and further objects and features of the invention will more fully be apparent from the following detailed description with accompanying drawings.

DESCRIPTION OF THE PREFERRED EMBODIMENTS

First Embodiment

Figure 1:
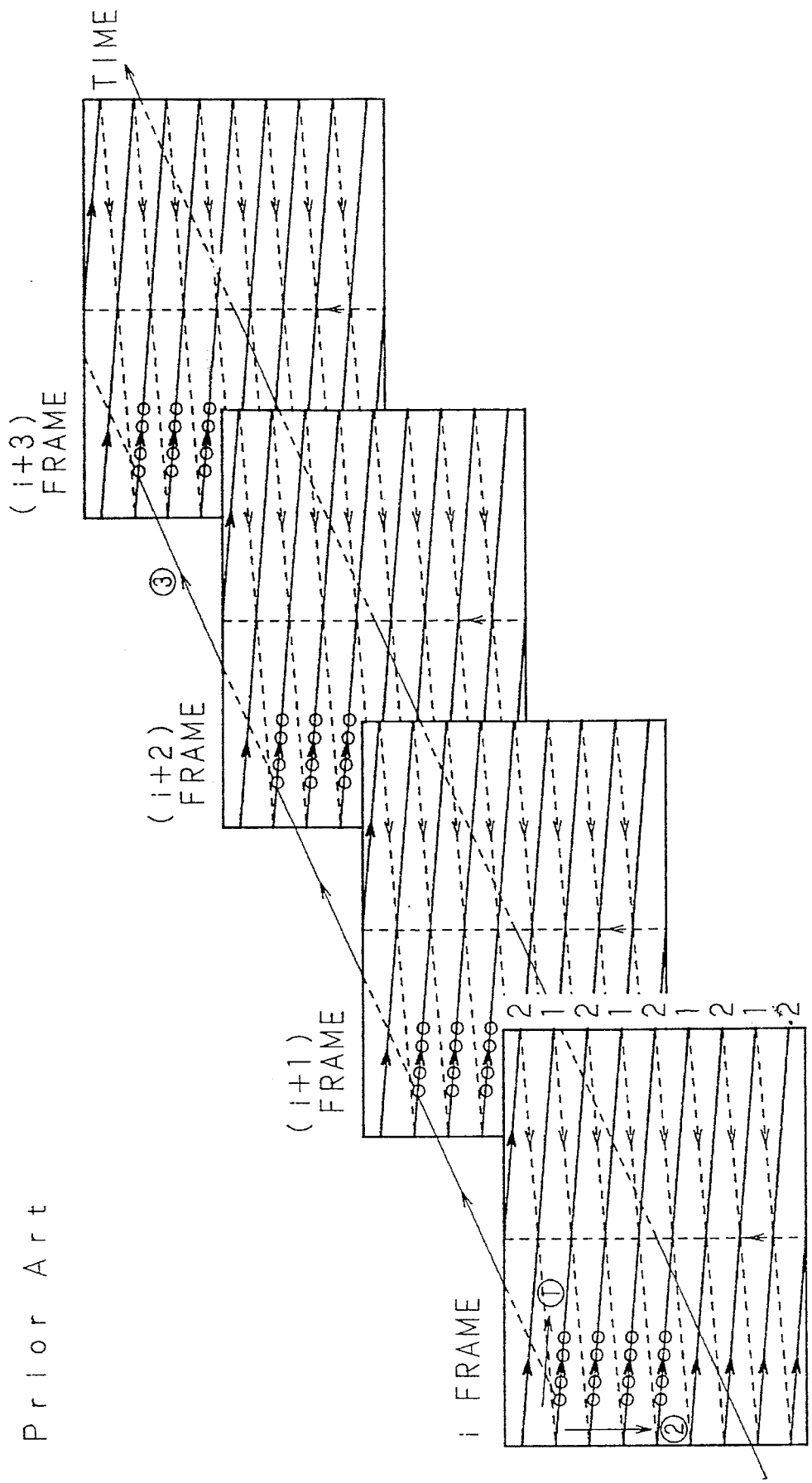
FIG. 1 is a conceptional view showing a conventional three-dimensional block in a non-interlaced form.
Figure 2:
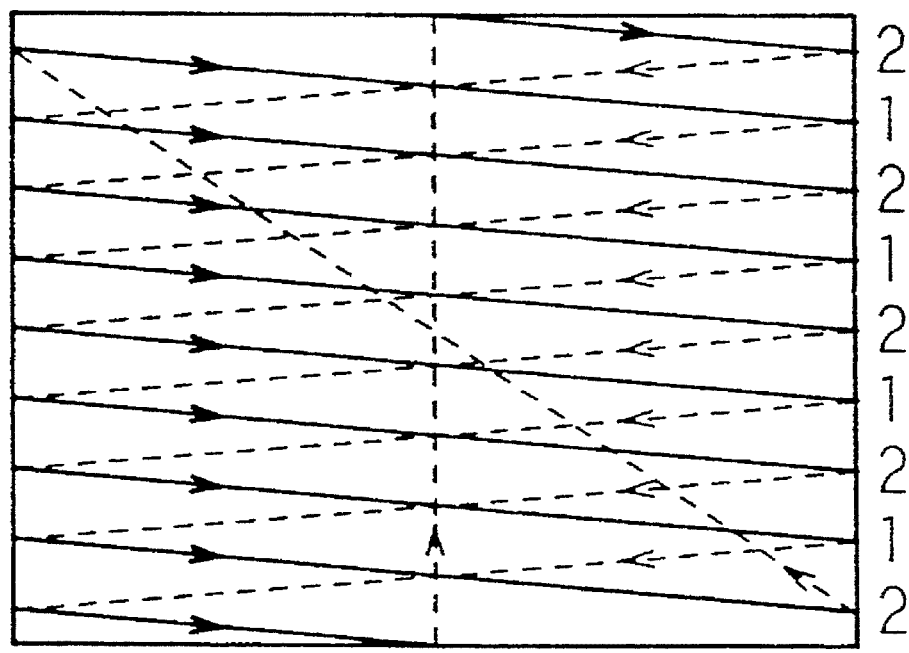
FIG. 2 is a view explanatory of a principle of interlaced scanning of a television screen.
Figure 3:
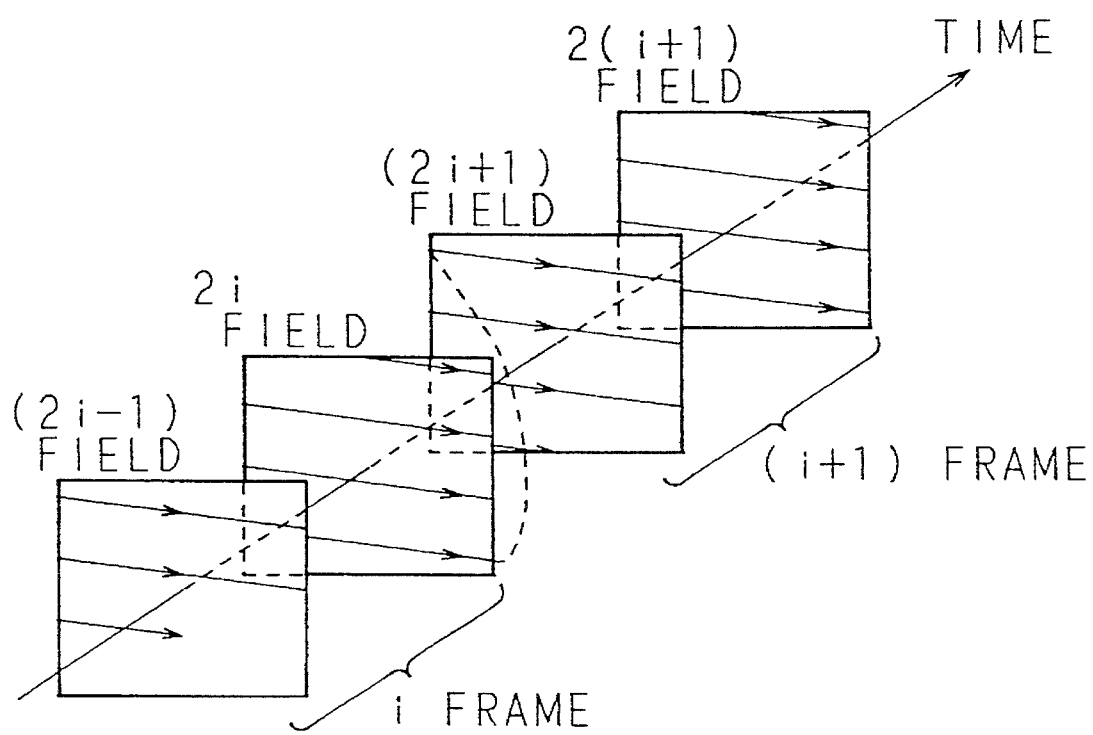
FIG. 3 is a conceptional view showing a relation between fields and frames in a standard television system.
Figure 4:
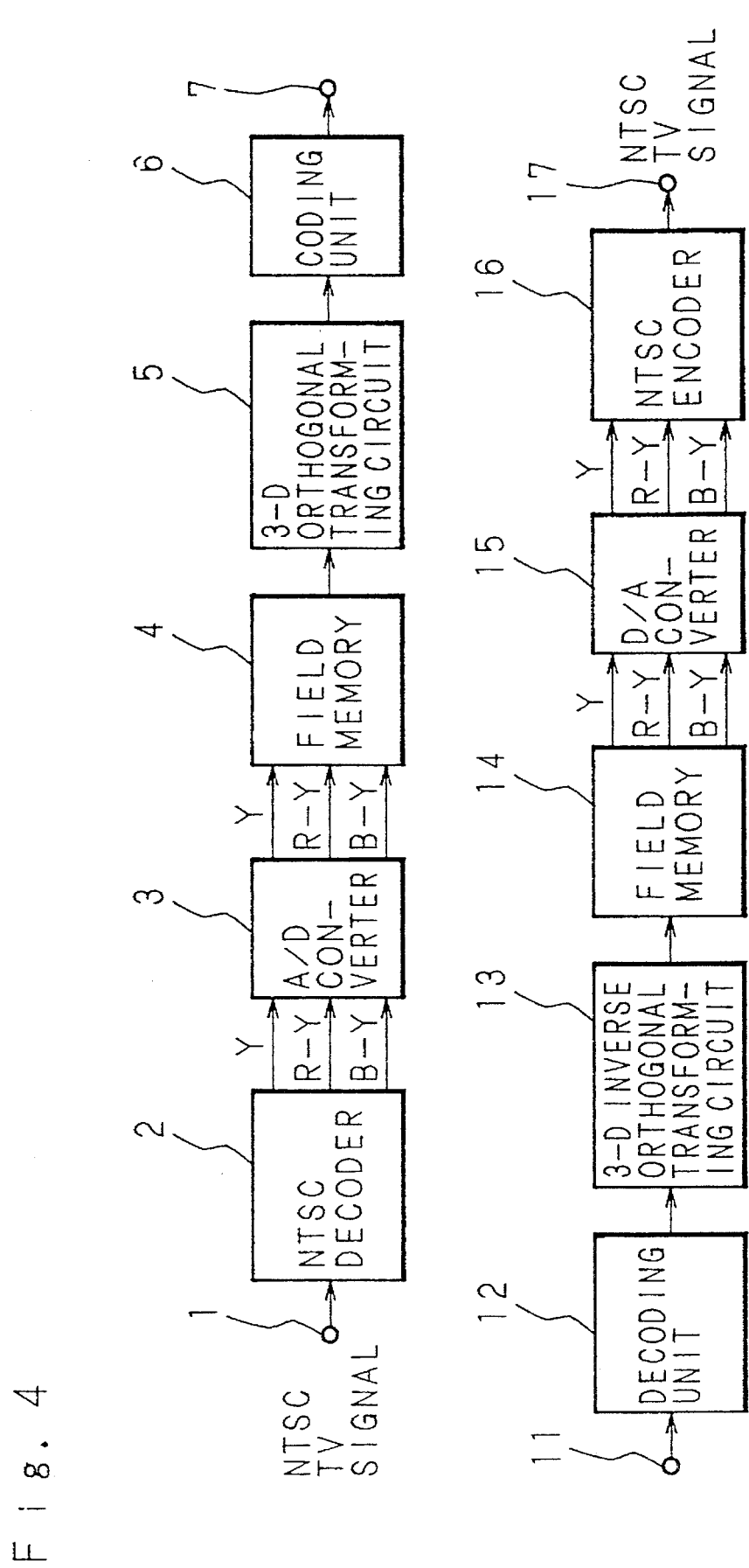
FIG. 4 is a block diagram showing a construction of an apparatus corresponding to a first embodiment of the invention.

In FIG. 4 which shows the construction of a coding/decoding apparatus according to a first embodiment, reference numeral 1 designates an input terminal for inputting a color television signal in NTSC system into an NTSC decoder 2. The NTSC decoder 2 separates the inputted color television signal into a luminance signal (Y signal) and a color difference signal (R-Y signal, B-Y signal) to output them to an analog-digital (hereinafter to be called A/D) converter 3. The A/D converter 3 converts the inputted signal into a digital signal and outputs the digital signal to a field memory 4. The field memory 4 bundles two-dimensional blocks in fields adjacent in temporal direction to compose a three-dimensional block (3-D block) and outputs data composed with 3-D block as a unit to a three-dimensional (3-D) orthogonal transforming circuit 5. The 3-D orthogonal transforming circuit 5 performs 3-D DCT (Discrete Cosine Transform), for example, on each 3-D block to obtain coefficients, and outputs the obtained coefficients to a coding unit 6. The coding unit 6 quantizes and codes the coefficients. The coded data is outputted through an output terminal 7. A coding system is composed of the above mentioned members 1 to 7.

In addition, reference numerals 11 to 17 show the members composing a decoding system. Reference numeral 11 designates an input terminal for inputting the coded data to a decoding unit 12. The decoding unit 12 decodes the coded data to an original 3-D data and outputs the data to a 3-D inverse orthogonal transforming circuit 13. The 3-D inverse orthogonal transforming circuit 13 performs 3-D inverse DCT to obtain the original 3-D block and outputs it to a field memory 14. The field memory 14 return the 3-D block to the original field screen and outputs a digital luminance signal (Y signal) and a color difference signal (R-Y signal, B-Y signal) to a digital/analog (hereinafter to be called D/A) converter 15. The D/A converter 15 converts an inputted signal into an analog signal and outputs it to an NTSC encoder 16. The NTSC encoder 16 reproduces NTSC color television signal with a luminance signal and a color difference signal. The reproduced color television signal is outputted through an output terminal 17.

In the following, explanation will be given on the operation. Generally, in reducing image information, it is convenient to deal with luminance signal and chrominance signal independently. Accordingly, after the NTSC color television signal inputted from the input terminal 1 is separated by the NTSC decoder 2 into a luminance signal (Y signal) and a color difference signal (R-Y signal, B-Y signal), each of these signals is digitized by the A/D converter 3. The sampling frequency of Y signal is 13.5 MHz, those of the R-Y signal and the B-Y signal are both 6.75 MHz. Therefore, in the case of NTSC color television signal, an effective sample number per one horizontal line of Y signal is 720, those of R-Y signal and B-Y signal are both 360, with 262.5 horizontal lines composing one field. Among these, data of eight fields are taken into the field memory 4, with effective lines of 250 horizontal lines for example, composing one field.

Figure 5:
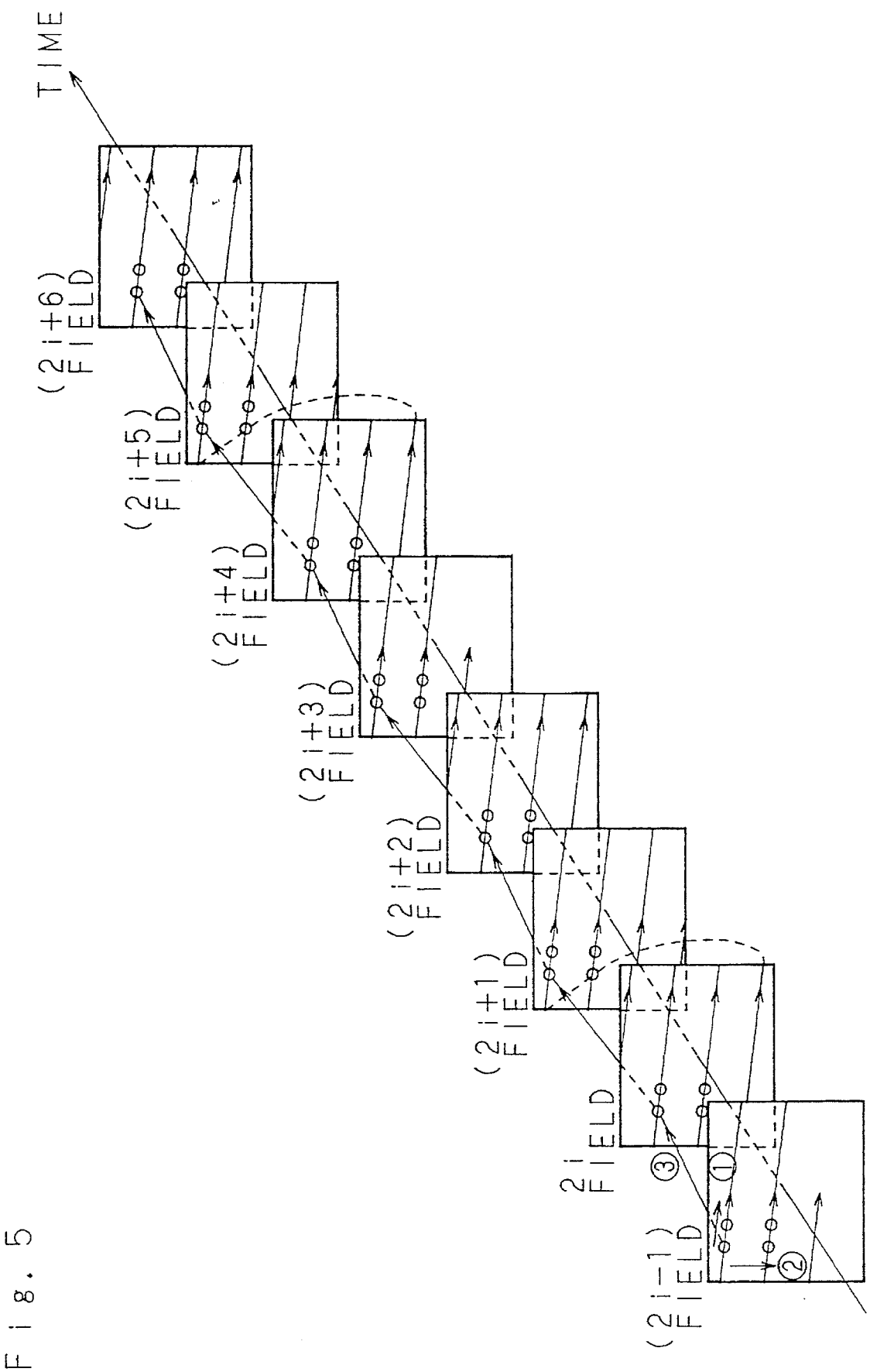
FIG. 5 is a conceptional view showing a three-dimensional block according to a first embodiment of the invention.

Further, while the data of the next eight fields is being taken in, data of a 3-D block as shown in FIG. 5 is outputted from the field memory 4 to the 3-D orthogonal transforming circuit 5.

In FIG. 5, a 3-D block is composed with a horizontal direction 1 as primary direction, a vertical direction 2 as secondary direction and a field direction (temporal direction) 3 as tertiary direction. Concretely, it shows a block of 2×2×8. In addition, as shown in FIG. 5, in an odd-number field and in an even-number field, for example in (2i−1)th field and in 2i-th field, spatial positions of picture elements do not coincide with each other in the vertical direction. The picture element in the upper left of 2i-th field is positioned lower than that in the upper left of (2i−1)-th field by 2 line. After 3-D DCT is performed on the data transmitted with such a 3-D block as a unit, in the 3-D orthogonal transforming circuit 5, the data is quantized by the coding unit 6, then coded by using Huffman code-words and so on, and outputted from the output terminal 7.

While in the decoding system from the input terminal 11 to the output terminal 17, a totally inverse process to that of the above-mentioned coding system from the input terminal 1 to the output terminal 7 is carried out, and the original NTSC color television signal is obtained and outputted from the output terminal 17.

Figure 6:
FIG. 6 is a picture showing one scene of a natural mobile picture.

Here, it will be described that the information reduction can be carried out according to the above-mentioned method. FIG. 6 is one scene of natural moving picture with a totem pole for a background. Explanation will be given on the example that 3-D DCT of 8×8×8 picture elements is performed on data in a part marked with a rectangle in the vicinity of the center on the right side. Table 1 shows the data which is obtained by quantizing luminance signals of the fields from t=0 to t=7 in the part marked with a rectangle into 8 bits uniformly. 3-D DCT is performed on this data and the fractions of 5 and over are counted as a unit and the rest are cut away, to obtain a coefficient as shown in Table 2(a), (b). When the obtained coefficients are coded by using a coding bit map in FIG. 7 and a 2-D scanning in FIG. 8, the coding length of the 3-D data is 1902 bits.

Figure 7:
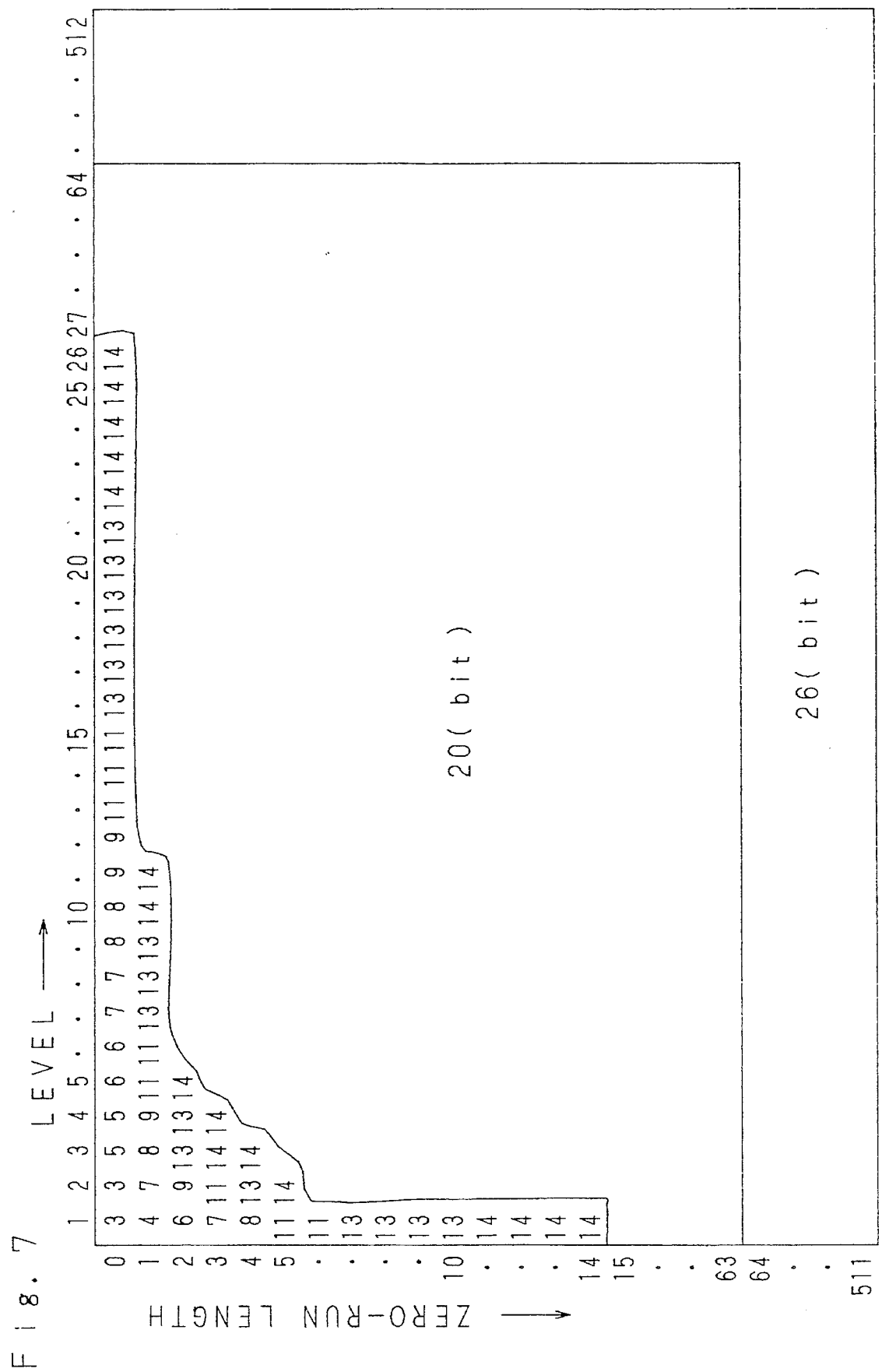
FIG. 7 is a two-dimensional bit map used when a coefficient is coded.
Figure 8:
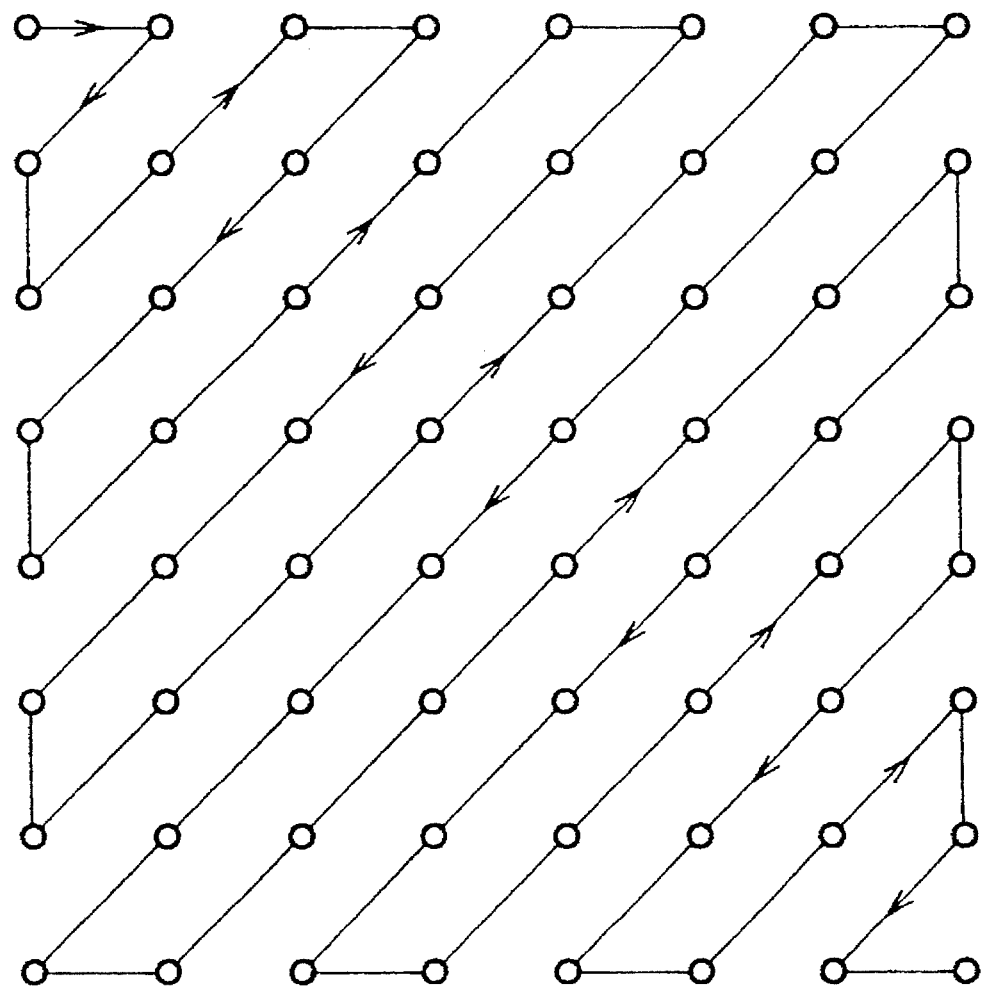
FIG. 8 is a scanning view of a two-dimensional coefficient.

In FIG. 7, an axis of abscissa shows levels of coefficients and axis of ordinate shows zero-run length, with numerals in the figure showing code length. FIG. 8 is a scanning view frequently used in 2-D DCT, and in this embodiment, such 2-D scanning is to be repeated eight times.

While the same data has been converted into non-interlaced form to be coded as a conventional way. Table 3 shows original data of a non-interlaced form. In this case, there are two 3-D blocks of 8×8×4 picture elements. The coefficients obtained by performing 3D-DCT on the two blocks are shown in Table 4(a), (b). When the coefficients are coded by using the coding bit map in FIG. 7 and the 2-D scanning in FIG. 8, the code length in each block is 1,188 bits and 1,136 bits, the sum being 2,325 bits.

As mentioned above, when compared with a conventional example, about 16% of information reduction has been accomplished in this embodiment. According to this embodiment, when information content is converted into a transmitting rate by performing coding on a four-frame image in FIG. 6, about 25.3 Mbps is obtained. In the same way, in a conventional example, transmitting rate is about 30.2 Mbps. From these facts, it can be understood that information reduction can be accomplished not only in a part of an image but in a whole image.

Second Embodiment

Figure 9:
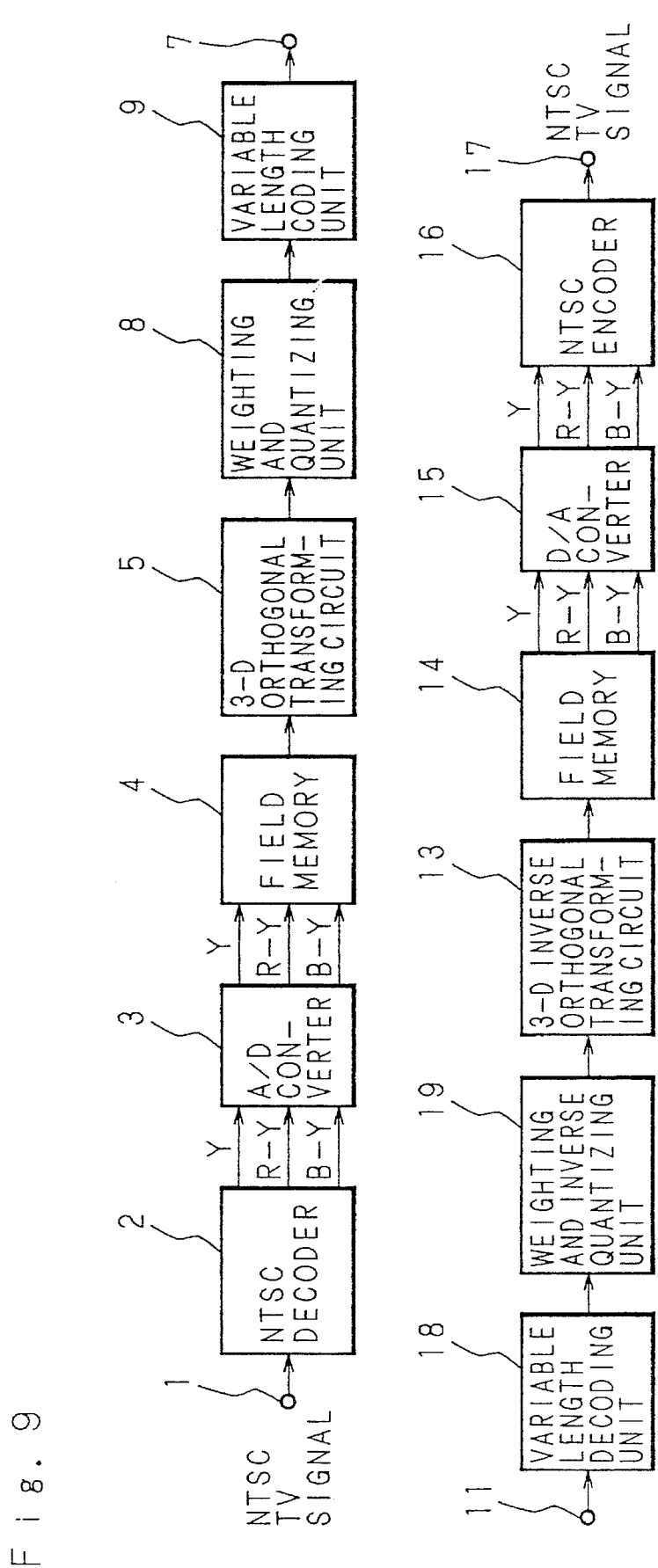
FIG. 9 is a block diagram showing a construction of an apparatus corresponding to a second embodiment of the invention.

Next, explanation will be given on the second embodiment of the invention. This is an example of coding the obtained coefficients after weighting in order to reduce information content. In FIG. 9 showing the construction of a coding/decoding apparatus according to a second embodiment, the parts with the same numbers as in FIG. 4 show the same members. The reference numeral 8 in the coding system designates a weighting and quantizing unit for quantizing the coefficients obtained in the 3-D orthogonal transforming circuit 5 after weighting. The weighting and quantizing unit 8 outputs the quantized data to a variable length coding unit 9. The variable length coding unit 9 performs variable length coding on the inputted data in the way that a brief code-word is assigned to data of high frequency by using Huffman code-words, for example. Further, reference numeral 18 in decoding system is a variable length decoding unit for decoding the variable-length-coded data into the original quantized data. The variable length decoding unit 18 outputs the quantized data to a weighting and inverse quantizing unit 19. The weighting and inverse quantizing unit 19 decodes the quantized data into the original data of coefficients.

Figure 10A:
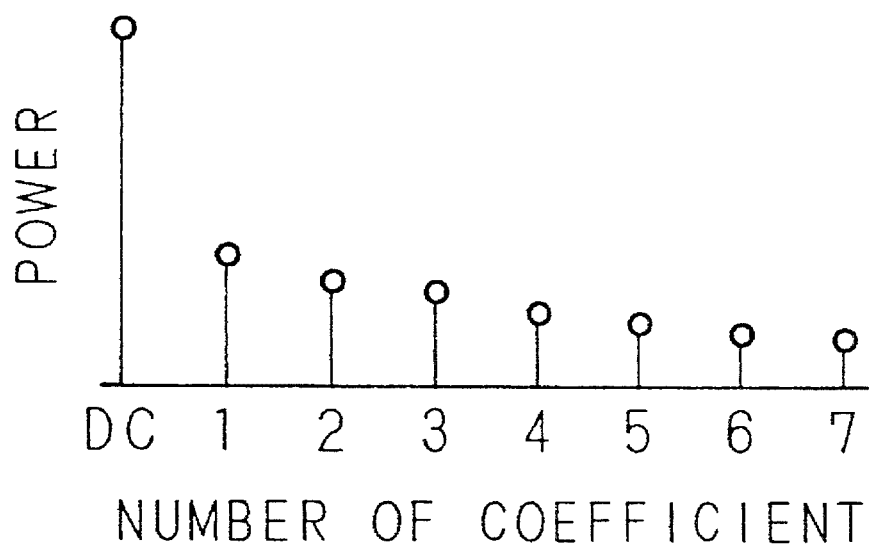
FIGS. 10 (a), (b) are power distribution views of coefficients after orthogonal transform.
Figure 10B:
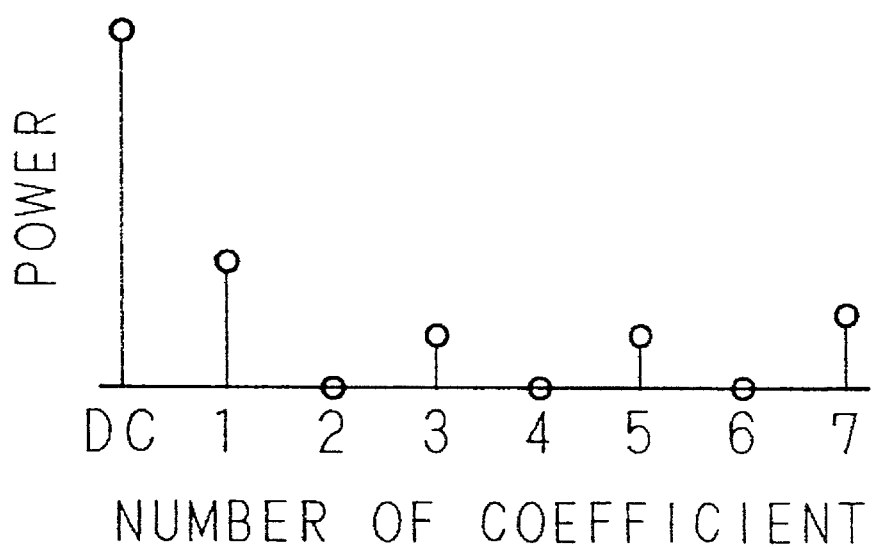
Figure 11:
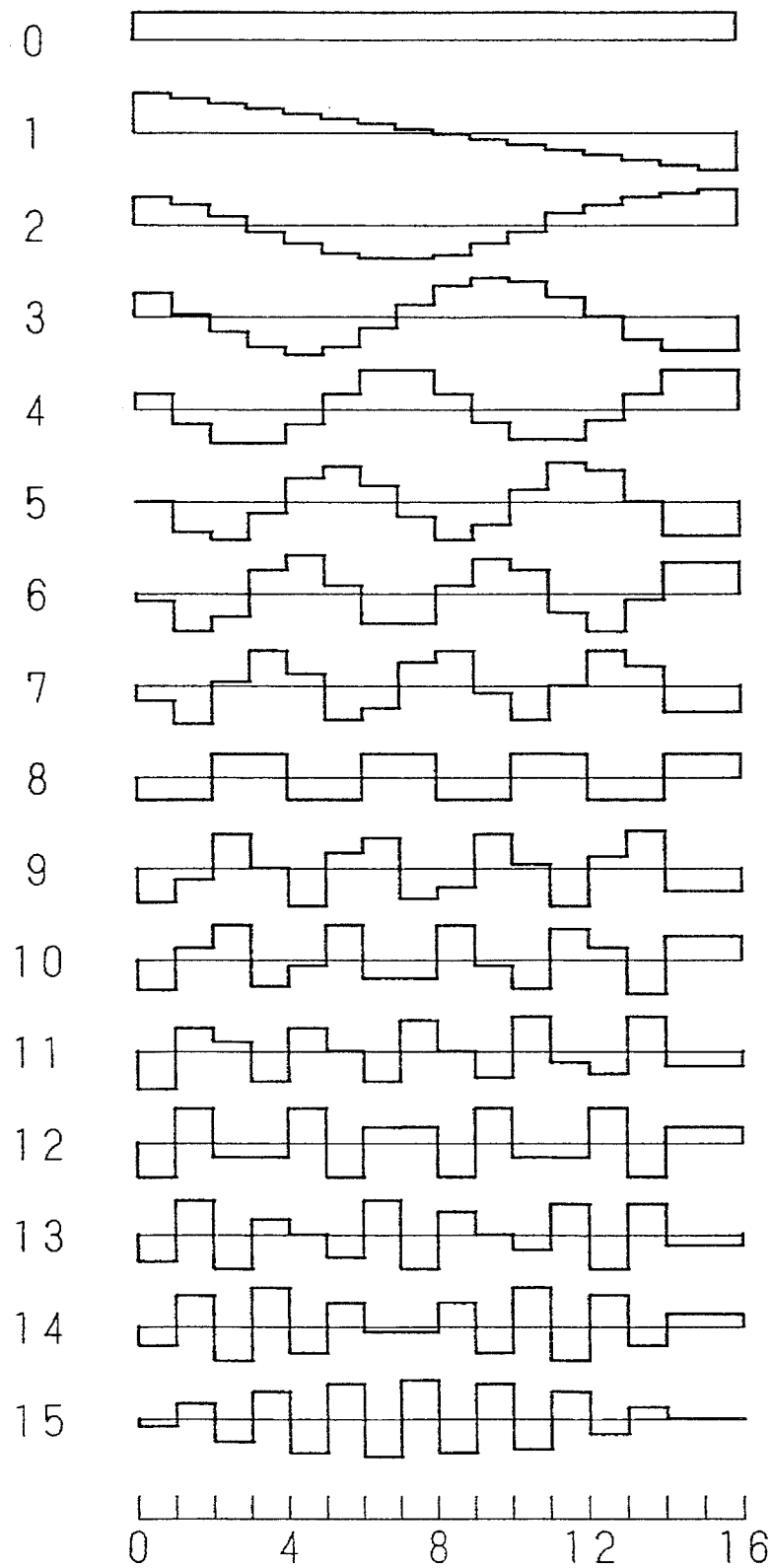
FIG. 11 is a view showing base vectors of DCT.

Next, explanation will be given on the operation. Here, explanation will be concentrated on the operation of weighting which is different from that of the first embodiment. In the same way as in the first embodiment, the data with 3-D block as a unit as shown in FIG. 5 is outputted from the field memory 4 to the 3-D orthogonal transforming circuit 5, and 3-D DCT is performed on the data. FIG. 10 shows power distribution of coefficients according to DCT of tertiary direction (temporal direction). FIG. 10(a) shows the case of moving picture and it is understood that each coefficient has power and much information content. FIG. 10(b) shows the case of still picture. Originally there is no information change in a temporal direction in a still picture, due to interlaced scanning, spatial displacement is converted into temporal displacement, power appears on odd-number-th coefficients when DC component is made 0-th. This is related to a degree N of base vector of DCT. In FIG. 11, base vectors of DCT when N=16 are shown.

Here, the reason why power appears only on odd-number-th coefficients will be explained on the basis of definition formula of DCT. N point DCT is defined by the following equations.

$$y(DC) = \frac{2}{N\sqrt{2}} \sum_{k=0}^{N-1} x(k)$$

$$y(i) = \frac{2}{N} \sum_{k=0}^{N-1} \left\{ x(k) \times \cos \frac{(2k+1)i}{2N} \pi \right\}$$

$$(i = 1, 2, \ldots, N-1)$$

here, when odd fields and even fields are considered separately, Y(i) is expressed in the following equation.

$$y(i) = \frac{2}{N} \sum_{k=0}^{N/2-1} \left\{ x(2k) \times \cos \frac{(4k+1)i}{2N} \pi \right\} +$$

$$\frac{2}{N} \sum_{k=0}^{N/2-1} \left\{ x(2k+1) \times \cos \frac{(4k+3)i}{2N} \pi \right\}$$

$$(i = 1, 2, \ldots, N-1)$$

In the case of a still picture, as the image signals in even fields are the same each other and those in odd fields are also the same as each other. x(0)=x(2) x(N–2) and x(1)=x(3)= , . . . ,=x(N–1 ). When this is utilized, y(i) is further expressed by the following equation.

$$y(i) = \frac{2}{N} x(0) \times \sum_{k=0}^{N/2-1} \cos \frac{(4k+1)i}{2N} \pi +$$

$$\frac{2}{N} x(1) \times \sum_{k=0}^{N/2-1} \cos \frac{(4k+3)i}{2N} \pi$$

$$(i = 1, 2, \ldots, N-1)$$

In addition, in a cosine function, as COSα= –COS(π–β)= –COS(π+α)=COS(2π–α), each of the following equations are affected in the case where i=2, 4, 6, . . . , N–2.

$$\sum_{k=0}^{N/2-1} \cos \frac{(4k+1)i}{2N} \pi = 0$$

$$\sum_{k=0}^{N/2-1} \cos \frac{(4k+3)i}{2N} \pi = 0$$

In this way, even-number-th coefficients except DC component are zero, and power appears in odd-number-th coefficients.

Figure 12A:
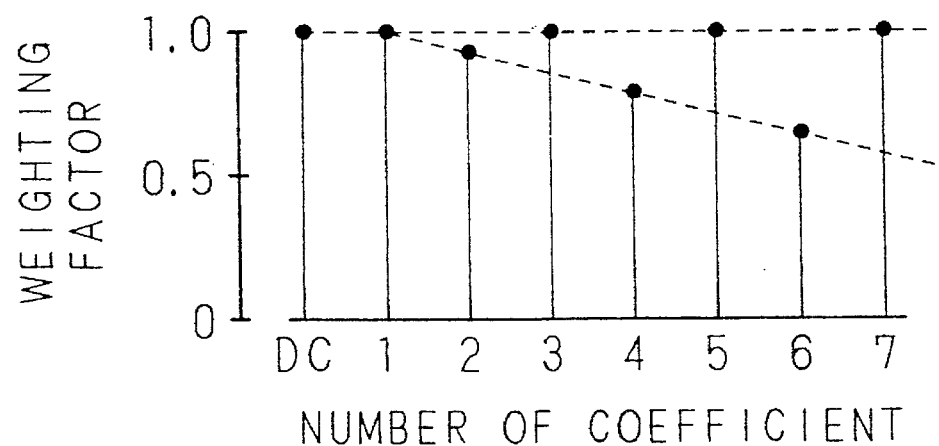
FIGS. 12 (a), (b) are views showing one embodiment of a weighting factor.

In the weighting and quantizing unit 8, weighting is performed only on even-number-th coefficients with no information of a still picture, to quantize them equally and roughly. In FIG. 12(a), an example of a weighting factor for weighting is shown. In the case of a still picture, as this weighting is performed on coefficients whose values are originally zero, there is no influence. In the case of a moving picture, as the coefficient is converted into zero or a small number by the weighting, information content is reduced by the operation of the variable length coding unit 9, in which Huffman code-words are used.

The variable-length-coded data by the variable length coding unit 9 is outputted from the output terminal 7.

Figure 12B:
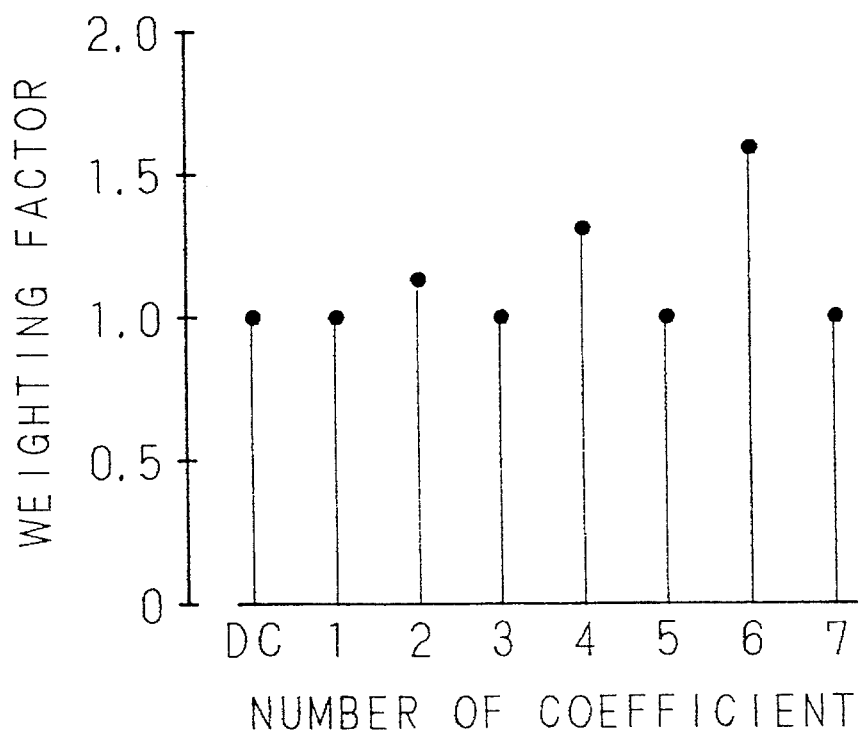

While in the decoding system from the input terminal 11 to the output terminal 17, NTSC color television signal is obtained and outputted from the output terminal 17 by performing a totally inverse process to that of the above-mentioned coding system. In FIG. 12(b), an example of weighting factor used in decoding is shown.

Figure 13A:
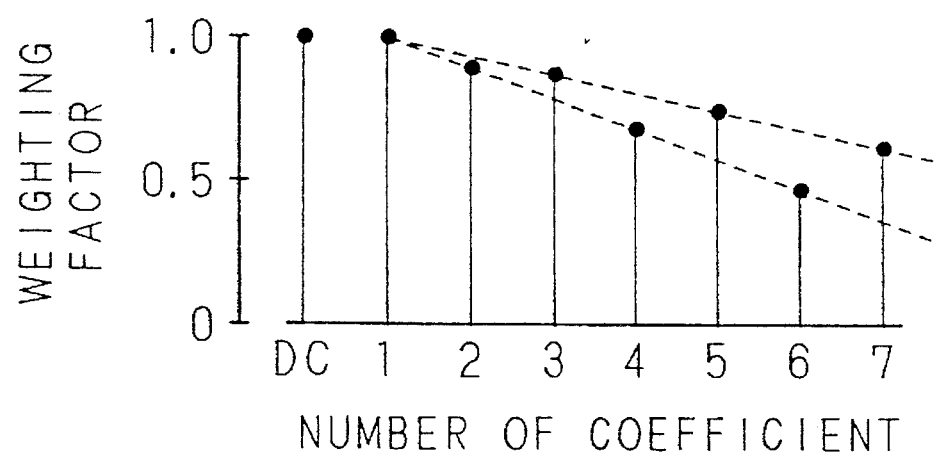
FIGS. 13 (a), (b) are views showing another embodiments of a weighting factor.
Figure 13B:
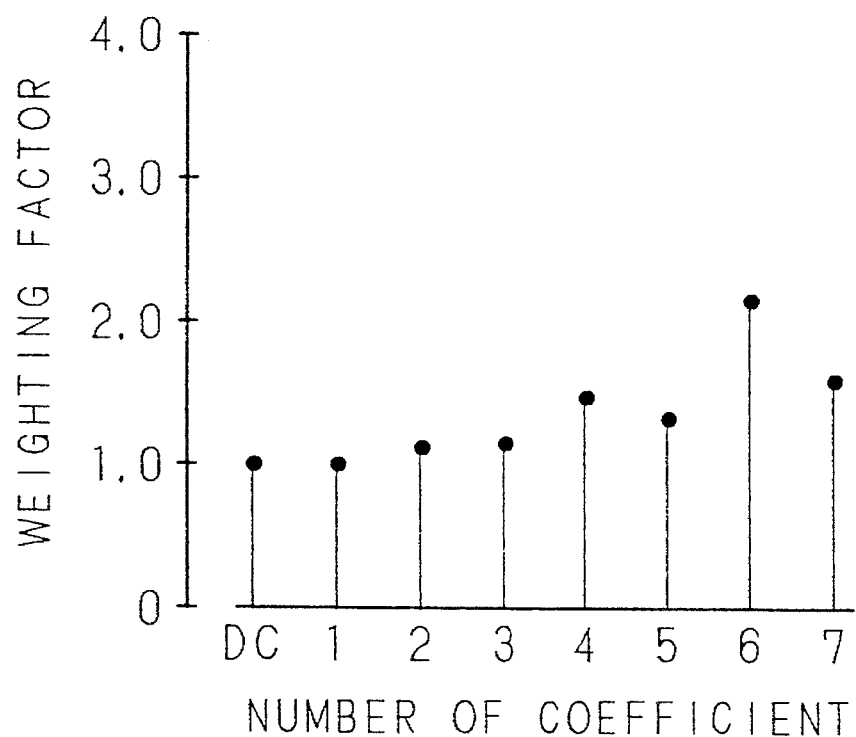
Figure 14A:
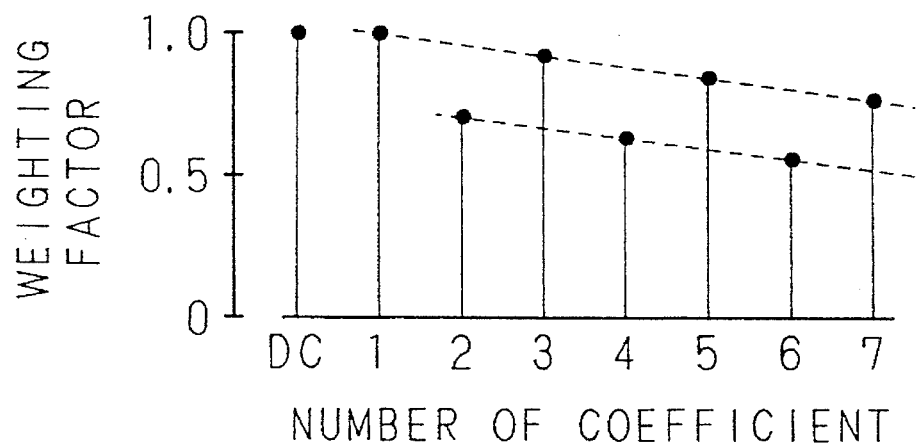
FIGS. 14 (a), (b) are views showing still another embodiment of a weighting factor.
Figure 14B:
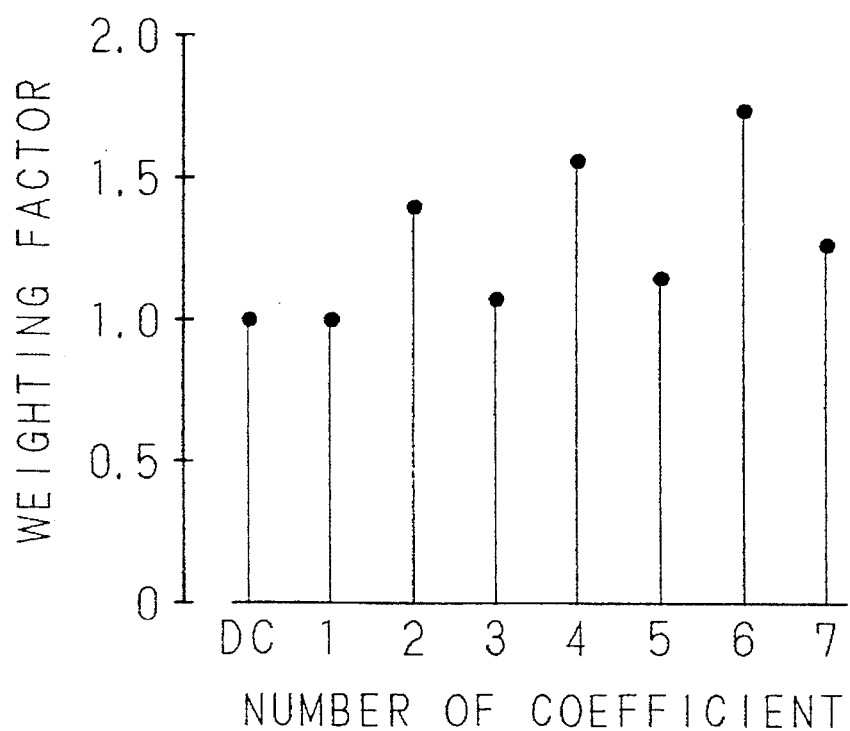

Another example of weighting a factor used in coding and decoding is shown in FIG. 13 and FIG. 14. In this example, each weighting is performed in the way that even-number-th coefficients are more roughly quantized than odd-number-th coefficients. Accordingly, information content can be largely reduced at the time of the moving picture, restricting image deterioration of a still picture to a slight degree.

In addition, although explanation is given on the example using a 3-D orthogonal transform in the second embodiment, it is a matter of course that a method of processing 2-D space is optional, as long as orthogonal transform is performed in a temporal direction.

In the second embodiment as above-mentioned, weighting and quantizing is performed only on even-number-th coefficients by which a pseudo-moving part does not appear or weighting at lower rate and more roughly quantizing is performed on coefficients by which a pseudo-moving part does not appear than on odd-number-th coefficients by which a pseudo-moving part appears. Accordingly information content at the time of the moving picture is largely reduced without judging whether the picture is moving or still and without deterioration of quality of still picture.

Third Embodiment

In the above-mentioned first and second embodiments, in the case where 3-D block is constructed by signals in interlaced scanning form, as the spatial positions of picture elements in odd-fields and those in even-fields do not coincide with each other in vertical direction, there still is a possibility that redundancy can be further reduced. In the third embodiment of the invention, inter-picture elements calculation is performed in a vertical direction in each field on the digital video signal in interlaced scanning form, thereby spatial positions of picture elements in odd-fields and those in even-fields are coincided with each other, then 3-D orthogonal transform is performed thereon.

Figure 15:
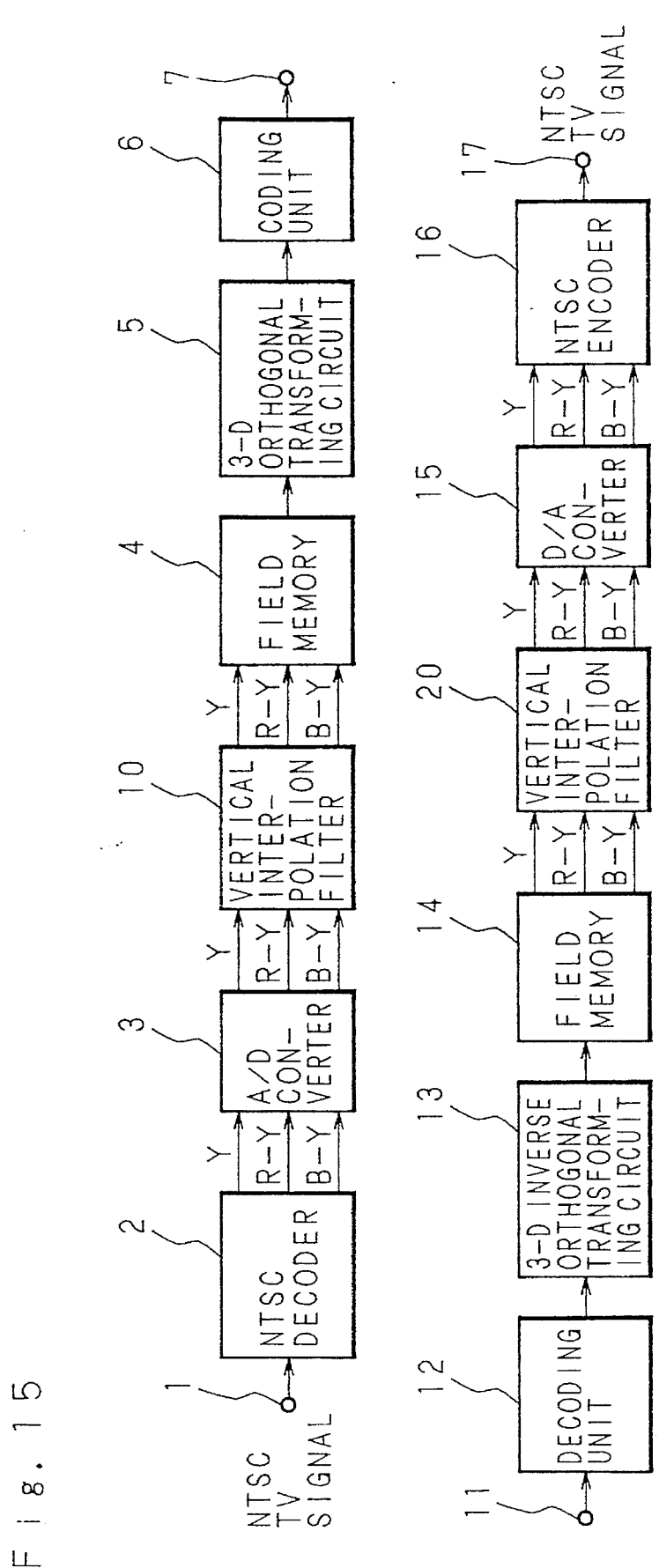
FIG. 15 is a block diagram showing a construction of an apparatus corresponding to a third embodiment of the invention.

In FIG. 15 showing the construction of coding/decoding apparatus according to the third embodiment, the parts with the same numbers as those in FIG. 4 are the same members. Reference numeral 10 designates a vertical interpolation filter which performs inter-picture elements calculation in a vertical direction in each field of the digital luminance signal and a color difference signal outputted from the A/D converter 3 and the spatial positions of picture elements in odd-fields and those in even-fields are made to coincide with each other. The vertical interpolation filter 10 outputs data to the field memory 4 after the positions are made to coincide. Reference numeral 20 in the decoding system is a vertical interpolation filter which reverses the original digital data of picture element from the data, in which positions of picture elements are made to coincide, that is outputted from the field memory 14. The vertical interpolation filter 20 outputs the decoded data of picture element to the D/A converter 15.

Next, explanation will be given on the operation. As the operation of the embodiment is same as that of the above-mentioned first embodiment except that the positions of picture elements are made to coincide in the vertical interpolation filter 10 and reversion of the original data of picture element in the vertical interpolation filter 20, explanation will be concentrated here on the different points.

Figure 16:
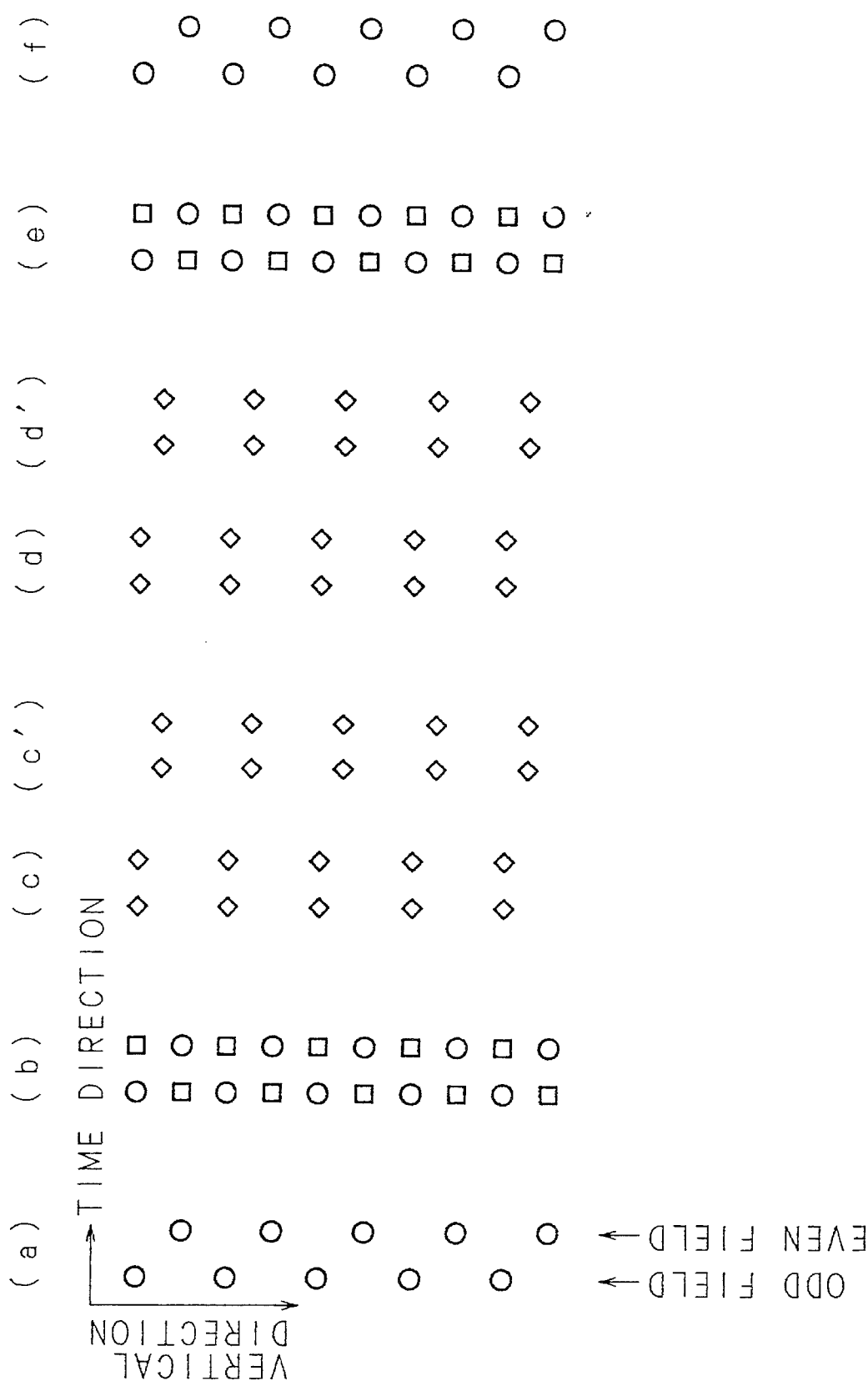
FIG. 16 is a conceptional view showing picture elements explanatory of an operation of the third embodiment.

FIG. 16 is a conceptional view showing picture elements explanatory of the operation in the third embodiment.

The luminance signal and the color difference signal are converted into digital signals by the A/D converter 3. The spatial positions of picture elements (shown by o) of them in odd field add those in even field, for example, those in (2i −1)-th field and those in 2i-th field, do not coincide with each other as shown in FIG. 16(a). Picture elements in the even field are positioned ½ line lower than those in odd field.

Figure 17:
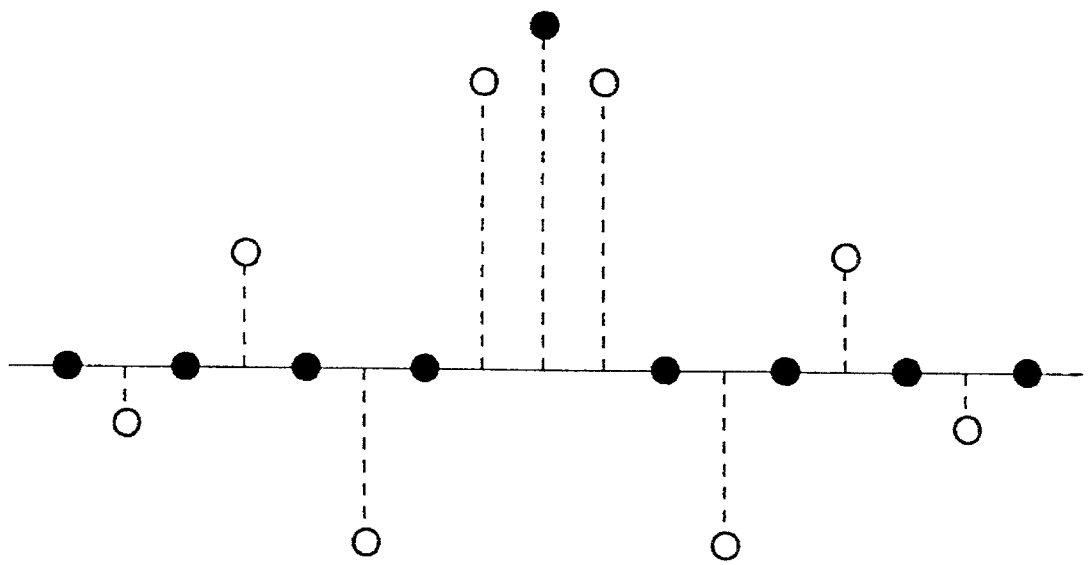
FIG. 17 is a view showing an example of impulse response of an odd-tap interpolation filter.

In order to perform position coincidence in the vertical interpolation filter 10, a method of over sampling is used. In order to double the number of picture elements, zero data is inserted to every other element in the vertical direction. Mark □ in FIG. 16 (b) shows the inserted zero data. When the data is passed through a low pass filter for interpolation, interpolated data is obtained in the inserted zero data and the number of picture elements are made double. As an interpolation filter, an odd-tap filter with impulse response shown in FIG. 17, for example, can be used. As shown in FIG. 16 (c), the obtained interpolated data is removed so that the picture elements with the same spatial positions are left, and the data after removal is outputted to the field memory 4. In the field memory 4, 3-D block with plurality of picture elements as a unit is constructed at the field memory 4 with the horizontal direction for a primary direction, the vertical direction for a secondary direction and the temporal direction for a tertiary direction. And 3-D DCT is performed on every constructed 3-D block in the 3-D orthogonal transforming circuit 5.

In the decoding system, the 3-D block data on which 3-D inverse orthogonal transform has been performed becomes field data (FIG. 16 (d)) in which spatial positions of picture elements coincide with each other in the field memory 14. Here, in order to reproduce the original data of picture element, in the same way as in the coding system, zero data is inserted to be passed through an interpolation filter, data as shown in FIG. 16 (e) is obtained. Moreover, when the data marked with □ is removed, digital signal (FIG. 16 (f)) in interlaced scanning form, same as that in FIG. 16 (a), is obtained.

Figure 19:
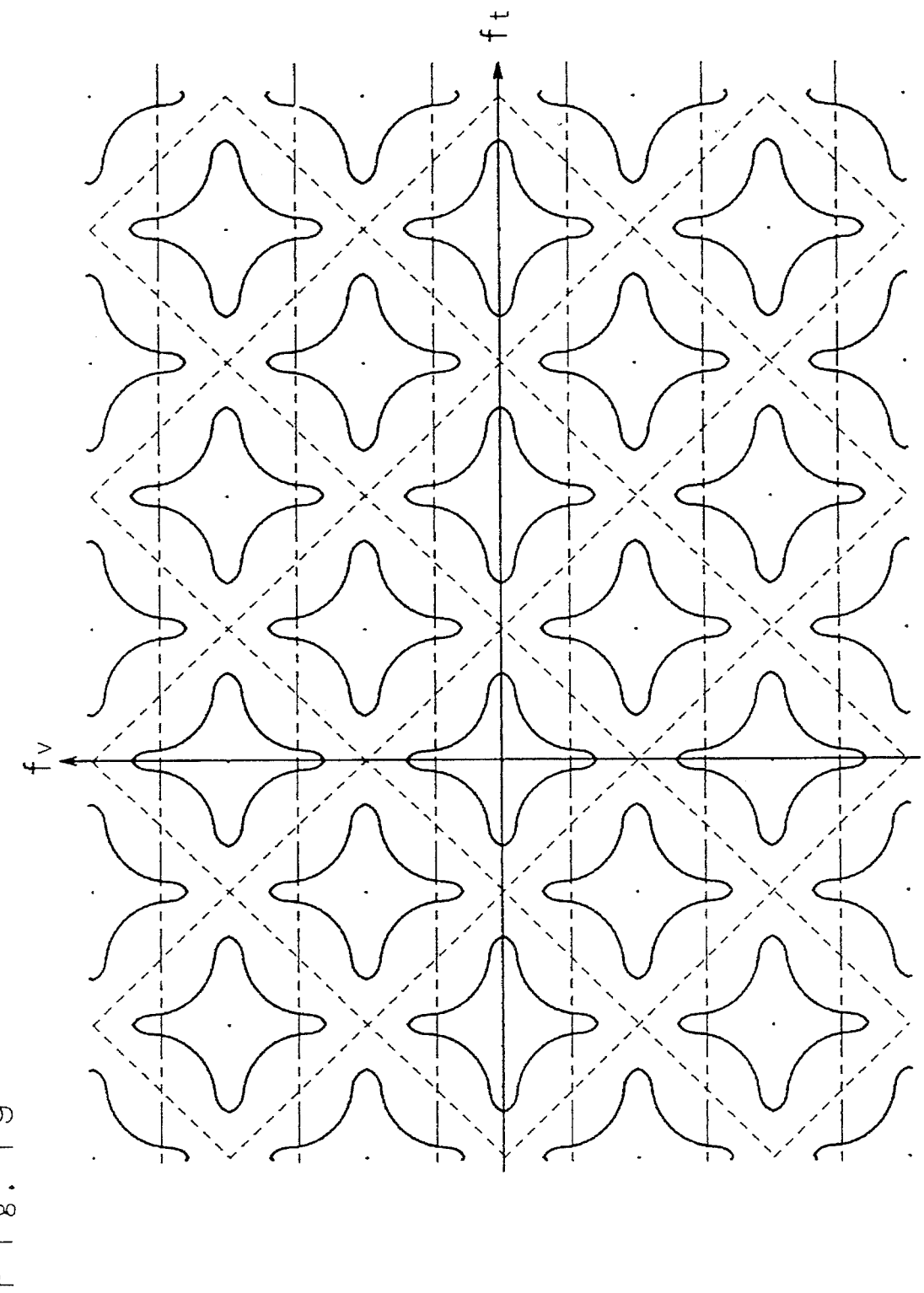
FIG. 19 is a conceptional view showing spectral distribution at the time of interlaced scanning.
Figure 20:
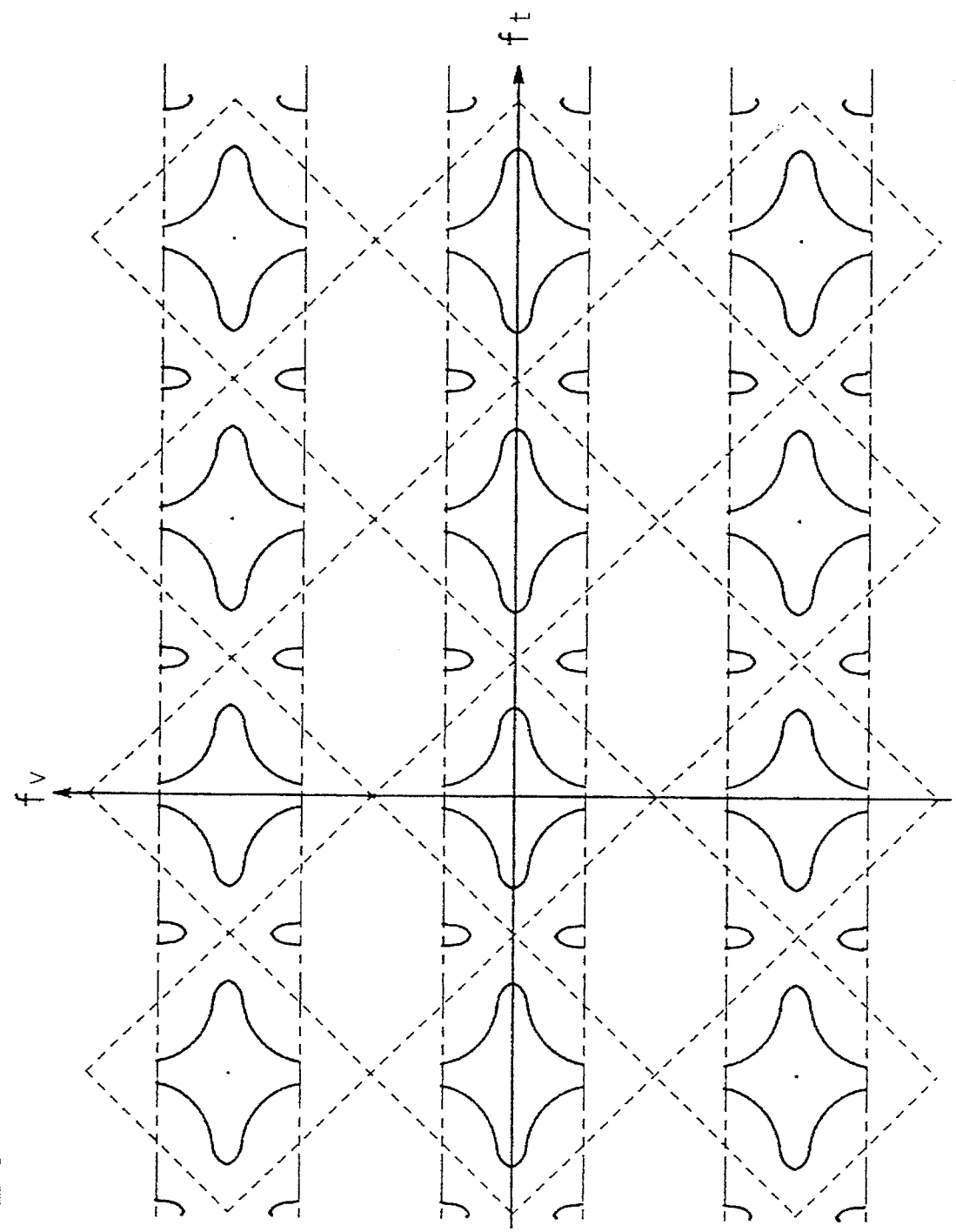
FIG. 20 is a conceptional view showing spectral distribution at the time of over-sampling.
Figure 21:
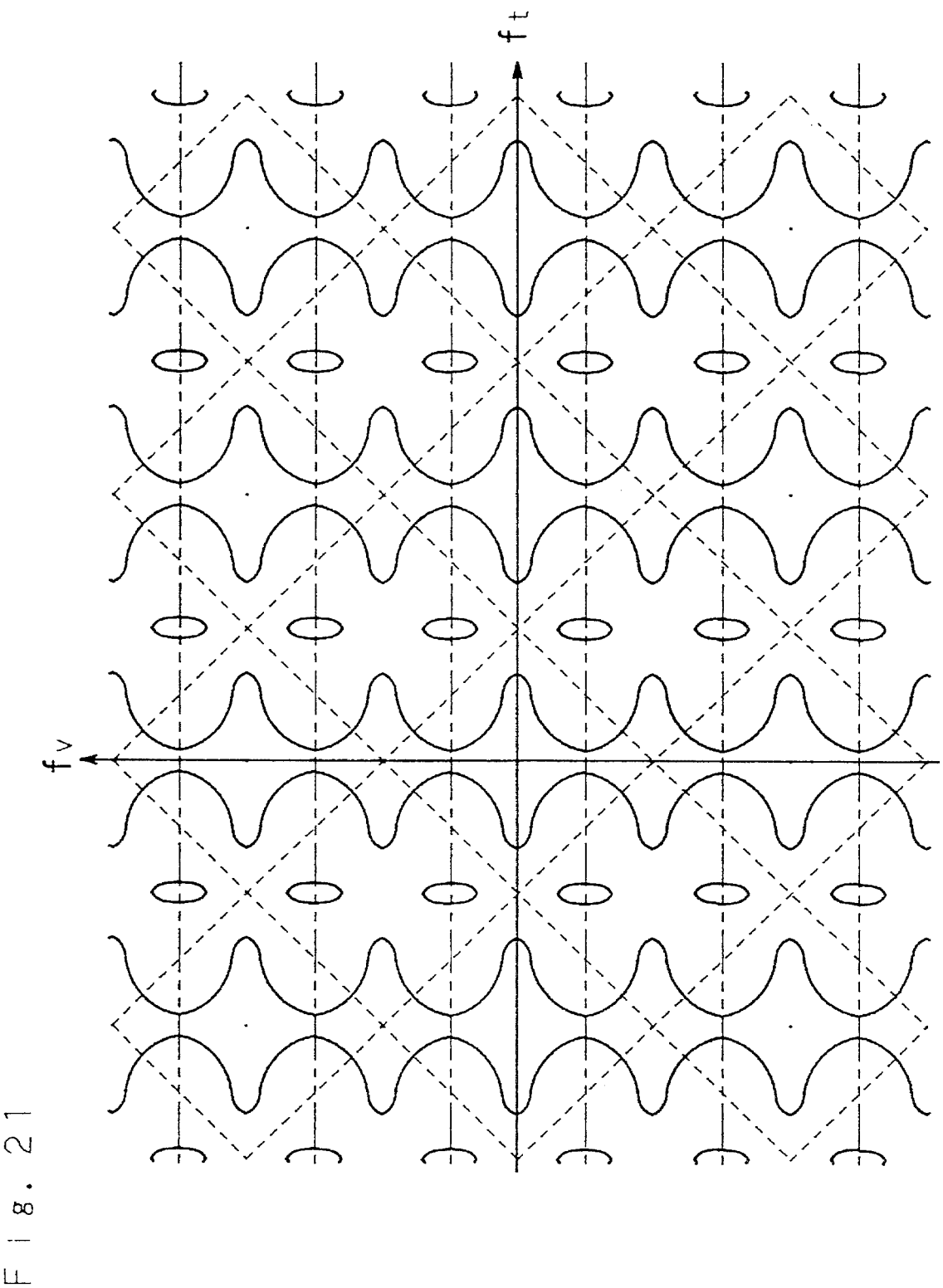
FIG. 21 is a conceptional view showing spectral distribution at the time when picture elements are coincided with each other.

The above description is conceptionally shown on frequency axes in FIGS. 19, 20, 21. In each figure, the axis of ordinate shows frequency in vertical direction, and the axis of abscissa shows frequency in temporal direction. FIG. 19 is a view at the time of interlaced scanning corresponding to FIG. 16 (a). The image is woven in an oblique direction due to the effect of offset sampling. The state in FIG. 20 corresponds to that in FIG. 16 (b), in which the number of picture elements are doubled by two-times over sampling, and vertical lower components are extracted by a vertical low pass filter. Moreover the state in FIG. 21 corresponds to that in FIG. 16 (C), in which the number of picture elements becomes the same as the original by ½ removal. As the high components returned in vertical direction are well separated in the temporal direction, it is profitable for information reduction. While in the decoding system, as the process thereof is inverse to that of coding system, FIGS. 16 (d), (e), (f) respectively correspond to FIGS. 21, 20, 19, original digital signal in interlaced scanning form being decoded.

In the above example, for making the positions of picture elements coincide with each other, a method of over sampling and a method of ½ removal are used, but immediate position coincidence can be performed by using an all pass filter. For example, in FIG. 17, it can be performed by applying a filter having response with mark ● to an odd field and a filter having response with a mark o to an even field.

Figure 18:
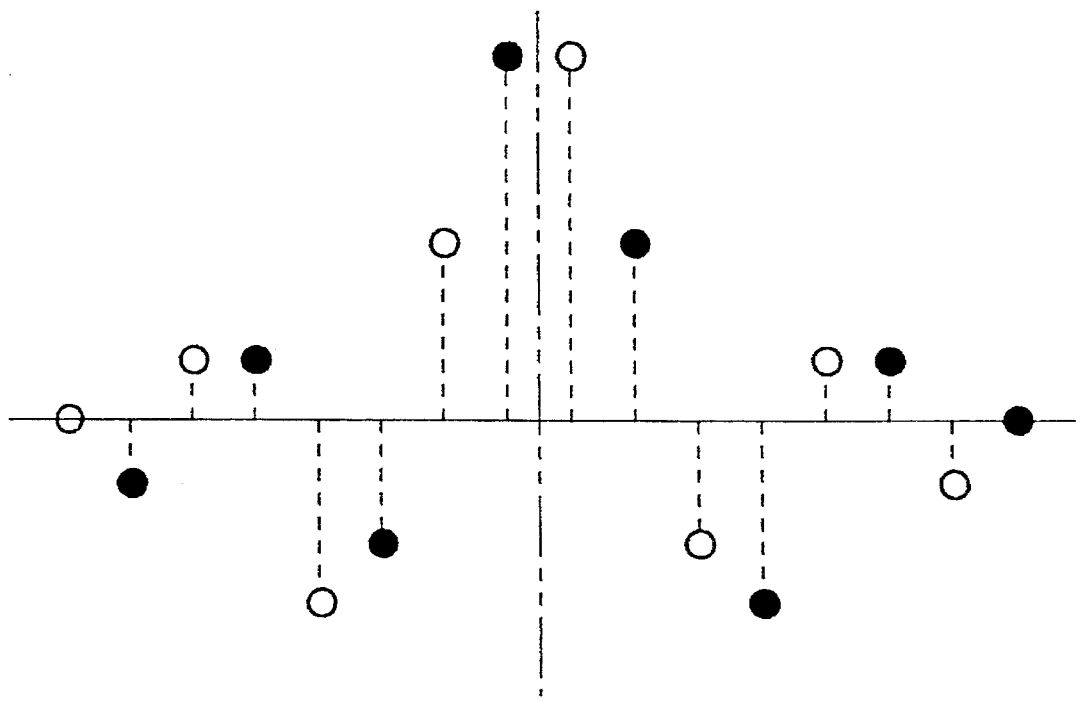
FIG. 18 is a view showing an example of an impulse response of even-tap interpolation filter.

Next, it is shown that a filter whose tap number is even can be processed in the same way. As an example of an even-tap interpolation filter, there is one which has impulse response as shown in FIG. 18. As to a signal (FIG. 16 (a)) in interlaced scanning form, when zero data is inserted (FIG. 16 (b)) to every other element in the vertical direction to be passed through an interpolation filter in the same way as in odd-tap filter, interpolation data by two-times over sampling can be obtained. Here, as the center of gravity of the even-tap filter is not positioned on picture element but on the center between adjacent picture elements, the positions of picture elements after filtering are to be moved by ¼ line. By ½ removal, picture elements having the same spatial positions are obtained, as shown in FIG. 16 (c'). The frequency spectrum at this time is not different from that of odd-tap filter at all.

A signal inputted to an interpolation filter at the time of decoding is shown in FIG. 16 (d'). When zero data is inserted and filtered, as it dislocates by ¼ line in the same way as in coding, a signal shown in FIG. 16 (e) is obtained. When offset sampling is performed in the same way as odd-tap filter, the original digital signal (FIG. 16 (f)) in interlaced scanning form is obtained.

In addition, in the same way as in the case where an odd-tap filter is used, in the case where an even-tap filter is used, immediate position coincidence of picture elements in the odd field with those in the even field can be performed.

In addition, in the above embodiments, although explanation is given on a "so-called" signal of 4:2:2 component which samples Y signal with 13.5 MHz, R-Y signal and B-Y signal with 6.75 MHz, the frequency for sampling is not limited to those above-mentioned.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

TABLE 1

| t = 0 | | | | | | | | t = 1 | | | | | | | |
| --- | --- | --- | --- | --- | --- | --- | --- | --- | --- | --- | --- | --- | --- | --- | --- |
| 53 | 71 | 112 | 132 | 130 | 125 | 121 | 122 | 143 | 130 | 90 | 87 | 117 | 130 | 125 | 121 |
| 39 | 43 | 73 | 107 | 117 | 118 | 119 | 121 | 116 | 98 | 61 | 58 | 103 | 131 | 129 | 123 |
| 119 | 90 | 74 | 86 | 103 | 113 | 116 | 116 | 92 | 77 | 48 | 31 | 55 | 99 | 118 | 119 |
| 160 | 161 | 136 | 113 | 117 | 119 | 116 | 116 | 122 | 155 | 136 | 102 | 74 | 81 | 99 | 112 |
| 51 | 100 | 118 | 114 | 114 | 115 | 117 | 119 | 135 | 164 | 163 | 161 | 145 | 119 | 117 | 119 |
| 104 | 130 | 123 | 116 | 114 | 116 | 119 | 119 | 52 | 28 | 41 | 87 | 116 | 119 | 116 | 114 |
| 119 | 120 | 116 | 112 | 112 | 115 | 116 | 117 | 75 | 65 | 89 | 125 | 127 | 116 | 115 | 115 |
| 124 | 117 | 114 | 116 | 117 | 118 | 118 | 120 | 48 | 80 | 115 | 118 | 114 | 111 | 111 | 115 |
| t = 2 | | | | | | | | t = 3 | | | | | | | |
| 138 | 139 | 141 | 135 | 103 | 83 | 101 | 125 | 156 | 157 | 155 | 155 | 165 | 171 | 160 | 126 |
| 168 | 148 | 122 | 105 | 71 | 58 | 85 | 117 | 162 | 147 | 134 | 134 | 136 | 138 | 121 | 88 |
| 113 | 109 | 101 | 81 | 54 | 39 | 48 | 84 | 170 | 171 | 174 | 167 | 136 | 115 | 92 | 60 |
| 26 | 36 | 96 | 146 | 142 | 118 | 81 | 77 | 127 | 120 | 113 | 103 | 102 | 92 | 71 | 41 |
| 57 | 61 | 117 | 154 | 163 | 164 | 153 | 125 | 106 | 72 | 33 | 24 | 62 | 130 | 156 | 135 |
| 48 | 59 | 58 | 34 | 31 | 68 | 105 | 117 | 103 | 105 | 80 | 51 | 76 | 136 | 158 | 155 |
| 61 | 84 | 79 | 66 | 80 | 115 | 127 | 119 | 60 | 48 | 43 | 50 | 56 | 40 | 25 | 42 |
| 62 | 43 | 40 | 63 | 102 | 118 | 116 | 115 | 76 | 59 | 54 | 77 | 88 | 73 | 69 | 98 |
| t = 4 | | | | | | | | t = 5 | | | | | | | |
| 175 | 166 | 160 | 160 | 159 | 157 | 157 | 166 | 39 | 36 | 35 | 32 | 29 | 41 | 87 | 129 |
| 168 | 172 | 168 | 155 | 138 | 132 | 135 | 135 | 147 | 171 | 182 | 180 | 171 | 167 | 164 | 157 |
| 185 | 176 | 169 | 168 | 173 | 172 | 157 | 129 | 159 | 162 | 164 | 168 | 168 | 162 | 149 | 134 |
| 170 | 162 | 137 | 121 | 115 | 103 | 101 | 101 | 154 | 183 | 188 | 180 | 171 | 166 | 171 | 177 |
| 121 | 131 | 120 | 94 | 55 | 27 | 35 | 95 | 64 | 117 | 163 | 167 | 144 | 118 | 114 | 102 |
| 73 | 93 | 102 | 107 | 101 | 66 | 61 | 107 | 48 | 62 | 101 | 130 | 127 | 111 | 77 | 38 |
| 89 | 76 | 62 | 54 | 47 | 48 | 56 | 53 | 48 | 45 | 57 | 80 | 92 | 102 | 106 | 81 |
| 96 | 84 | 78 | 67 | 56 | 68 | 89 | 82 | 78 | 88 | 91 | 86 | 71 | 53 | 42 | 41 |
| t = 6 | | | | | | | | t = 7 | | | | | | | |
| 56 | 41 | 43 | 42 | 38 | 36 | 34 | 32 | 88 | 98 | 95 | 90 | 88 | 88 | 89 | 94 |
| 71 | 88 | 127 | 159 | 178 | 185 | 183 | 173 | 64 | 72 | 62 | 44 | 38 | 40 | 37 | 36 |
| 153 | 157 | 168 | 161 | 164 | 166 | 168 | 168 | 51 | 59 | 80 | 90 | 110 | 146 | 171 | 185 |
| 92 | 102 | 126 | 164 | 189 | 188 | 175 | 167 | 90 | 112 | 136 | 150 | 155 | 159 | 163 | 166 |
| 80 | 46 | 40 | 80 | 135 | 161 | 157 | 137 | 110 | 102 | 85 | 83 | 99 | 131 | 171 | 194 |
| 109 | 78 | 48 | 49 | 77 | 111 | 130 | 123 | 117 | 110 | 100 | 67 | 35 | 44 | 90 | 145 |
| 73 | 68 | 54 | 43 | 47 | 65 | 87 | 96 | 127 | 129 | 121 | 97 | 71 | 51 | 54 | 90 |
| 64 | 71 | 74 | 82 | 92 | 92 | 80 | 64 | 48 | 58 | 67 | 67 | 63 | 50 | 42 | 56 |

If response with a mark ● in FIG. 18 is applied to an odd field and response with a mark o to an even field respectively.

As mentioned above, in the third embodiment, as to a video signal in interlaced scanning form, positions of picture elements in the odd field and those in the even field are made coincide with each other in 2-D space by a vertical interpolation filter intrafield, then a 3-D block is composed by bundling odd and even fields in the temporal direction, and orthogonal transform is performed on it to code it, therefore information reduction is performed more obviously as to a video signal in interlaced scanning form than the first embodiment. In addition, it is a matter of course that it is also profitable to combine the third embodiment with the second embodiment.

TABLE 2 (a)

| t' = 0 | | | | | | | |
| --- | --- | --- | --- | --- | --- | --- | --- |
| 298.00 | −11.00 | 2.00 | −1.00 | −1.00 | .00 | .00 | .00 |
| 38.00 | 6.00 | .00 | 1.00 | −1.00 | .00 | .00 | .00 |
| −26.00 | 4.00 | 2.00 | 1.00 | 2.00 | .00 | .00 | .00 |
| −14.00 | −8.00 | 5.00 | −2.00 | .00 | .00 | .00 | .00 |
| 4.00 | −1.00 | −6.00 | −2.00 | 1.00 | −1.00 | .00 | .00 |
| −2.00 | 7.00 | .00 | −1.00 | .00 | .00 | .00 | .00 |
| −3.00 | −2.00 | 4.00 | .00 | .00 | .00 | 1.00 | .00 |
| −2.00 | −2.00 | 2.00 | 1.00 | .00 | 1.00 | .00 | .00 |
| t' = 1 | | | | | | | |
| 2.00 | 1.00 | −1.00 | 2.00 | .00 | .00 | .00 | .00 |
| −13.00 | 9.00 | 5.00 | 1.00 | 1.00 | .00 | .00 | .00 |

TABLE 2 (a)-continued

| | | | | | | | |
|---|---|---|---|---|---|---|---|
| 28.00 | −14.00 | .00 | 3.00 | 2.00 | 1.00 | .00 | .00 |
| 22.00 | −6.00 | −10.00 | −1.00 | −2.00 | .00 | −1.00 | .00 |
| 13.00 | 5.00 | −3.00 | −3.00 | −1.00 | .00 | .00 | .00 |
| −2.00 | 3.00 | .00 | 1.00 | −1.00 | .00 | .00 | .00 |
| −2.00 | −1.00 | 1.00 | 1.00 | .00 | .00 | .00 | .00 |
| 4.00 | 2.00 | −4.00 | −1.00 | .00 | .00 | .00 | .00 |
| | | | $t' = 2$ | | | | |
| −6.00 | −17.00 | 1.00 | −2.00 | .00 | −1.00 | .00 | .00 |
| −35.00 | −15.00 | .00 | 2.00 | .00 | .00 | .00 | .00 |
| −14.00 | 8.00 | −6.00 | −1.00 | .00 | .00 | 1.00 | .00 |
| 2.00 | 12.00 | −2.00 | .00 | 1.00 | 1.00 | −1.00 | .00 |
| 7.00 | 4.00 | −5.00 | −1.00 | −2.00 | −1.00 | .00 | .00 |
| 11.00 | 4.00 | 4.00 | −2.00 | .00 | .00 | .00 | .00 |
| −7.00 | −1.00 | 4.00 | 1.00 | .00 | 1.00 | .00 | .00 |
| 2.00 | −4.00 | .00 | 1.00 | .00 | −1.00 | .00 | .00 |
| | | | $t' = 3$ | | | | |
| 19.00 | 4.00 | −9.00 | −1.00 | .00 | .00 | −1.00 | .00 |
| 5.00 | −14.00 | 2.00 | .00 | 1.00 | −1.00 | 1.00 | .00 |
| −9.00 | −13.00 | 1.00 | 1.00 | .00 | 3.00 | 1.00 | .00 |
| −21.00 | −4.00 | −10.00 | −3.00 | 2.00 | −1.00 | .00 | .00 |
| −13.00 | 9.00 | 11.00 | −6.00 | −1.00 | −1.00 | .00 | .00 |
| −4.00 | −3.00 | 11.00 | 5.00 | .00 | 1.00 | .00 | .00 |
| −2.00 | 6.00 | −4.00 | 3.00 | 1.00 | .00 | .00 | .00 |
| −12.00 | 1.00 | −1.00 | −1.00 | .00 | .00 | .00 | .00 |

TABLE 2 (b)

| | | | | | | | |
|---|---|---|---|---|---|---|---|
| | | | $t' = 4$ | | | | |
| 2.00 | 13.00 | 7.00 | −1.00 | .00 | −1.00 | .00 | .00 |
| 7.00 | −8.00 | −11.00 | 4.00 | −2.00 | 2.00 | .00 | .00 |
| 12.00 | −1.00 | −11.00 | .00 | 1.00 | 1.00 | .00 | .00 |
| 11.00 | 1.00 | 3.00 | −5.00 | −1.00 | −2.00 | .00 | .00 |

TABLE 2 (b)-continued

| | | | | | | | |
|---|---|---|---|---|---|---|---|
| 3.00 | −4.00 | 6.00 | 3.00 | −1.00 | .00 | .00 | .00 |
| 14.00 | 5.00 | −6.00 | 2.00 | .00 | .00 | .00 | 1.00 |
| 21.00 | −8.00 | −3.00 | −1.00 | −1.00 | .00 | .00 | .00 |
| −1.00 | −5.00 | .00 | 1.00 | .00 | .00 | .00 | .00 |
| | | | $t' = 5$ | | | | |
| −1.00 | −9.00 | −4.00 | 7.00 | −1.00 | 2.00 | .00 | .00 |
| .00 | 3.00 | −12.00 | −6.00 | 2.00 | 2.00 | .00 | .00 |
| −2.00 | 7.00 | −1.00 | −6.00 | 2.00 | −1.00 | .00 | .00 |
| −8.00 | −8.00 | 7.00 | 3.00 | −6.00 | 1.00 | .00 | .00 |
| −11.00 | −8.00 | −4.00 | 6.00 | 2.00 | 1.00 | 1.00 | .00 |
| −7.00 | 10.00 | −1.00 | −4.00 | .00 | −1.00 | .00 | .00 |
| 5.00 | 12.00 | 4.00 | −1.00 | −1.00 | .00 | −1.00 | .00 |
| −7.00 | 1.00 | 1.00 | .00 | .00 | .00 | .00 | .00 |
| | | | $t' = 6$ | | | | |
| −3.00 | 2.00 | −5.00 | −9.00 | .00 | 1.00 | .00 | .00 |
| −7.00 | .00 | 2.00 | −6.00 | 3.00 | .00 | .00 | .00 |
| −5.00 | 3.00 | 9.00 | 1.00 | 1.00 | −1.00 | −1.00 | .00 |
| 2.00 | −1.00 | −3.00 | −6.00 | −3.00 | 1.00 | .00 | .00 |
| 3.00 | −9.00 | −3.00 | 1.00 | 2.00 | 1.00 | .00 | .00 |
| 4.00 | −8.00 | .00 | 2.00 | .00 | −1.00 | .00 | .00 |
| −8.00 | 1.00 | .00 | −1.00 | 1.00 | .00 | .00 | .00 |
| 2.00 | −6.00 | −1.00 | .00 | −1.00 | .00 | .00 | .00 |
| | | | $t' = 7$ | | | | |
| −1.00 | .00 | 3.00 | −3.00 | 3.00 | .00 | 1.00 | .00 |
| 2.00 | 3.00 | −5.00 | −4.00 | 4.00 | .00 | 1.00 | .00 |
| 8.00 | 3.00 | 5.00 | .00 | −4.00 | 1.00 | −1.00 | .00 |
| −3.00 | 7.00 | −1.00 | −5.00 | 1.00 | −1.00 | .00 | .00 |
| .00 | −2.00 | −7.00 | 4.00 | 2.00 | 1.00 | 1.00 | .00 |
| 2.00 | .00 | .00 | 2.00 | −2.00 | .00 | .00 | .00 |
| .00 | 3.00 | 1.00 | .00 | 1.00 | −1.00 | .00 | .00 |
| 3.00 | 3.00 | 1.00 | .00 | −1.00 | .00 | .00 | .00 |

TABLE 3

| 1st block | | | | | | | | 2nd block | | | | | | | |
|---|---|---|---|---|---|---|---|---|---|---|---|---|---|---|---|
| | | | | | | | $t'' = 0$ | | | | | | | | |
| 143 | 130 | 90 | 87 | 117 | 130 | 125 | 121 | 135 | 164 | 163 | 161 | 145 | 119 | 117 | 119 |
| 53 | 71 | 112 | 132 | 130 | 125 | 121 | 122 | 51 | 100 | 118 | 114 | 114 | 115 | 117 | 119 |
| 116 | 98 | 61 | 58 | 103 | 131 | 129 | 123 | 52 | 28 | 41 | 87 | 116 | 119 | 116 | 114 |
| 39 | 43 | 73 | 107 | 117 | 118 | 119 | 121 | 104 | 130 | 123 | 116 | 114 | 116 | 119 | 119 |
| 92 | 77 | 48 | 31 | 55 | 99 | 118 | 119 | 75 | 65 | 89 | 125 | 127 | 116 | 115 | 115 |
| 119 | 90 | 74 | 86 | 103 | 113 | 116 | 116 | 119 | 120 | 116 | 112 | 112 | 115 | 116 | 117 |
| 122 | 155 | 136 | 102 | 74 | 81 | 99 | 112 | 48 | 80 | 115 | 118 | 114 | 111 | 111 | 115 |
| 160 | 161 | 136 | 113 | 117 | 119 | 116 | 116 | 124 | 117 | 115 | 116 | 117 | 118 | 118 | 120 |
| | | | | | | | $t'' = 1$ | | | | | | | | |
| 156 | 157 | 155 | 155 | 165 | 171 | 160 | 126 | 106 | 72 | 33 | 24 | 62 | 130 | 156 | 135 |
| 138 | 139 | 141 | 135 | 103 | 83 | 101 | 125 | 57 | 61 | 117 | 154 | 163 | 164 | 153 | 125 |
| 162 | 147 | 134 | 134 | 136 | 138 | 121 | 88 | 103 | 105 | 80 | 51 | 76 | 136 | 158 | 155 |
| 168 | 148 | 122 | 105 | 71 | 58 | 85 | 117 | 48 | 59 | 58 | 34 | 31 | 68 | 105 | 117 |
| 170 | 171 | 174 | 167 | 136 | 115 | 92 | 60 | 60 | 48 | 43 | 50 | 56 | 40 | 25 | 42 |
| 113 | 109 | 101 | 81 | 54 | 39 | 48 | 84 | 61 | 84 | 79 | 66 | 80 | 115 | 127 | 119 |
| 127 | 120 | 113 | 103 | 102 | 92 | 71 | 41 | 76 | 59 | 54 | 77 | 88 | 73 | 69 | 98 |
| 26 | 36 | 96 | 146 | 142 | 118 | 81 | 77 | 62 | 43 | 40 | 63 | 102 | 118 | 116 | 115 |
| | | | | | | | $t'' = 2$ | | | | | | | | |
| 39 | 36 | 35 | 32 | 29 | 41 | 87 | 129 | 64 | 117 | 163 | 167 | 144 | 118 | 114 | 102 |
| 175 | 166 | 160 | 160 | 159 | 157 | 157 | 166 | 121 | 131 | 120 | 94 | 55 | 27 | 35 | 95 |
| 147 | 171 | 182 | 180 | 171 | 167 | 164 | 157 | 48 | 62 | 101 | 130 | 127 | 111 | 77 | 38 |
| 168 | 172 | 168 | 155 | 138 | 132 | 135 | 135 | 73 | 93 | 102 | 107 | 101 | 66 | 61 | 107 |
| 159 | 162 | 164 | 168 | 162 | 164 | 149 | 134 | 48 | 45 | 57 | 80 | 92 | 102 | 106 | 81 |
| 185 | 176 | 169 | 168 | 173 | 172 | 157 | 129 | 89 | 76 | 62 | 54 | 47 | 48 | 56 | 53 |
| 154 | 183 | 188 | 180 | 171 | 166 | 171 | 177 | 78 | 88 | 91 | 86 | 71 | 53 | 42 | 41 |
| 170 | 162 | 137 | 121 | 115 | 103 | 101 | 101 | 96 | 84 | 78 | 67 | 56 | 68 | 89 | 82 |
| | | | | | | | $t'' = 3$ | | | | | | | | |
| 88 | 98 | 95 | 90 | 88 | 88 | 89 | 94 | 110 | 102 | 85 | 83 | 99 | 131 | 171 | 194 |
| 56 | 41 | 43 | 42 | 38 | 36 | 34 | 32 | 80 | 46 | 40 | 80 | 135 | 161 | 157 | 137 |
| 64 | 72 | 62 | 44 | 38 | 40 | 37 | 36 | 117 | 110 | 100 | 67 | 35 | 44 | 90 | 145 |

TABLE 3-continued

| 1st block | | | | | | | | 2nd block | | | | | | | |
|---|---|---|---|---|---|---|---|---|---|---|---|---|---|---|---|
| 71 | 88 | 127 | 159 | 178 | 185 | 183 | 173 | 109 | 78 | 48 | 49 | 77 | 111 | 130 | 123 |
| 51 | 59 | 80 | 90 | 110 | 146 | 171 | 185 | 127 | 129 | 121 | 97 | 71 | 51 | 54 | 90 |
| 153 | 157 | 158 | 161 | 164 | 166 | 168 | 168 | 73 | 68 | 54 | 43 | 47 | 65 | 87 | 96 |
| 90 | 112 | 136 | 150 | 155 | 159 | 163 | 166 | 48 | 58 | 67 | 67 | 63 | 50 | 42 | 56 |
| 92 | 102 | 126 | 164 | 189 | 188 | 175 | 167 | 64 | 71 | 74 | 82 | 92 | 92 | 80 | 64 |

TABLE 4 (a)

$t''' = 0$

| | | | | | | | |
|---|---|---|---|---|---|---|---|
| 337.00 | −2.00 | .00 | .00 | −1.00 | .00 | .00 | .00 |
| −23.00 | −4.00 | 7.00 | 1.00 | .00 | .00 | .00 | .00 |
| −8.00 | 1.00 | −3.00 | −1.00 | 1.00 | −2.00 | .00 | .00 |
| .00 | .00 | 9.00 | .00 | −1.00 | .00 | .00 | .00 |
| −1.00 | −12.00 | −1.00 | 2.00 | 1.00 | .00 | .00 | .00 |
| 5.00 | .00 | 3.00 | −2.00 | −2.00 | −1.00 | −1.00 | .00 |
| −2.00 | 3.00 | 4.00 | 8.00 | .00 | −1.00 | .00 | .00 |
| −3.00 | 1.00 | 3.00 | 4.00 | −6.00 | −1.00 | −1.00 | .00 |

$t''' = 1$

| | | | | | | | |
|---|---|---|---|---|---|---|---|
| −17.00 | 12.00 | 8.00 | 4.00 | .00 | −1.00 | .00 | .00 |
| 44.00 | −16.00 | −7.00 | 4.00 | 1.00 | .00 | .00 | .00 |
| 25.00 | .00 | −5.00 | −1.00 | −2.00 | −1.00 | .00 | .00 |
| −8.00 | 6.00 | 1.00 | 2.00 | .00 | .00 | .00 | .00 |
| −1.00 | 10.00 | 1.00 | 2.00 | −1.00 | .00 | .00 | .00 |
| −8.00 | 5.00 | 5.00 | 3.00 | .00 | .00 | .00 | .00 |
| 2.00 | −8.00 | 3.00 | 7.00 | 2.00 | .00 | 1.00 | .00 |
| 16.00 | 8.00 | 3.00 | 7.00 | −3.00 | −1.00 | −1.00 | .00 |

$t''' = 2$

| | | | | | | | |
|---|---|---|---|---|---|---|---|
| −30.00 | −31.00 | 3.00 | 4.00 | −2.00 | −2.00 | .00 | .00 |
| −30.00 | 7.00 | −7.00 | 3.00 | 1.00 | .00 | 1.00 | .00 |
| 21.00 | 25.00 | .00 | −1.00 | −1.00 | −1.00 | −1.00 | .00 |
| 11.00 | 1.00 | 2.00 | .00 | 1.00 | .00 | .00 | −1.00 |
| 20.00 | −8.00 | .00 | 2.00 | −1.00 | −1.00 | .00 | .00 |
| 14.00 | 4.00 | −7.00 | −2.00 | 1.00 | .00 | .00 | −1.00 |
| 12.00 | 10.00 | 6.00 | 4.00 | 1.00 | −1.00 | −1.00 | .00 |
| −21.00 | 4.00 | 18.00 | −3.00 | .00 | −2.00 | .00 | .00 |

$t''' = 3$

| | | | | | | | |
|---|---|---|---|---|---|---|---|
| 25.00 | −7.00 | 9.00 | 1.00 | −2.00 | −2.00 | −1.00 | .00 |
| −18.00 | −17.00 | −6.00 | −2.00 | 3.00 | .00 | 1.00 | .00 |
| −13.00 | 9.00 | 15.00 | −5.00 | 1.00 | −1.00 | −1.00 | .00 |
| −16.00 | −10.00 | −2.00 | 2.00 | 2.00 | 1.00 | .00 | .00 |
| −33.00 | 9.00 | 11.00 | .00 | 1.00 | −1.00 | .00 | .00 |
| −11.00 | −5.00 | −2.00 | −7.00 | 1.00 | .00 | .00 | −1.00 |
| −8.00 | 3.00 | 3.00 | 2.00 | .00 | 1.00 | −1.00 | 1.00 |
| −7.00 | −5.00 | 8.00 | −7.00 | 2.00 | −2.00 | .00 | .00 |

TABLE 4 (b)

$t''' = 0$

| | | | | | | | |
|---|---|---|---|---|---|---|---|
| 259.00 | −21.00 | 4.00 | −2.00 | .00 | .00 | .00 | .00 |
| 30.00 | −10.00 | 1.00 | −2.00 | −2.00 | .00 | .00 | .00 |
| 18.00 | −3.00 | 4.00 | 2.00 | −1.00 | .00 | −1.00 | .00 |
| 3.00 | 6.00 | .00 | −2.00 | −1.00 | .00 | −1.00 | .00 |
| 8.00 | 1.00 | 4.00 | 2.00 | .00 | .00 | −1.00 | .00 |
| −1.00 | 1.00 | 5.00 | −4.00 | −2.00 | −2.00 | −1.00 | .00 |
| 5.00 | −3.00 | 11.00 | 4.00 | −4.00 | 2.00 | −1.00 | .00 |
| −7.00 | 3.00 | −7.00 | .00 | 4.00 | 1.00 | 1.00 | .00 |

$t''' = 1$

| | | | | | | | |
|---|---|---|---|---|---|---|---|
| 22.00 | −9.00 | −10.00 | 1.00 | −2.00 | .00 | .00 | .00 |
| −15.00 | 8.00 | −5.00 | .00 | −3.00 | .00 | −1.00 | .00 |
| 5.00 | 9.00 | 4.00 | −1.00 | .00 | −1.00 | .00 | .00 |

TABLE 4 (b)-continued

| | | | | | | | |
|---|---|---|---|---|---|---|---|
| 3.00 | 8.00 | −2.00 | −1.00 | .00 | .00 | .00 | .00 |
| −8.00 | 9.00 | 3.00 | .00 | 2.00 | .00 | .00 | .00 |
| 2.00 | 3.00 | 3.00 | 1.00 | −1.00 | .00 | .00 | .00 |
| 2.00 | .00 | 2.00 | 9.00 | 2.00 | −1.00 | .00 | .00 |
| −9.00 | −13.00 | .00 | 10.00 | 4.00 | 1.00 | .00 | .00 |
| | | | $t''' = 2$ | | | | |
| 21.00 | −2.00 | 3.00 | −1.00 | 2.00 | −1.00 | −1.00 | .00 |
| −4.00 | −5.00 | 8.00 | 4.00 | 3.00 | −1.00 | −1.00 | .00 |
| −5.00 | −2.00 | −4.00 | −2.00 | −1.00 | −2.00 | .00 | .00 |
| 10.00 | 10.00 | −1.00 | −3.00 | .00 | −1.00 | .00 | .00 |
| 17.00 | 12.00 | −2.00 | .00 | .00 | .00 | .00 | −1.00 |
| −1.00 | 1.00 | 1.00 | −1.00 | .00 | 1.00 | .00 | .00 |
| −3.00 | 9.00 | 4.00 | −6.00 | 6.00 | .00 | .00 | .00 |
| −2.00 | 4.00 | 2.00 | −11.00 | 3.00 | .00 | 1.00 | .00 |
| | | | $t''' = 3$ | | | | |
| 7.00 | 22.00 | −18.00 | −10.00 | 2.00 | .00 | −1.00 | .00 |
| −4.00 | 9.00 | −14.00 | −8.00 | 4.00 | −4.00 | .00 | .00 |
| −2.00 | 17.00 | 5.00 | −11.00 | −3.00 | −1.00 | .00 | .00 |
| 8.00 | −2.00 | .00 | −2.00 | −2.00 | 1.00 | .00 | .00 |
| 21.00 | −7.00 | −6.00 | −3.00 | −1.00 | 1.00 | −1.00 | .00 |
| 11.00 | 2.00 | −20.00 | −1.00 | 1.00 | −1.00 | .00 | 1.00 |
| −2.00 | −1.00 | −15.00 | 5.00 | 5.00 | 3.00 | .00 | 1.00 |
| 4.00 | −20.00 | −13.00 | 6.00 | −4.00 | 5.00 | −1.00 | 1.00 |

What is claimed is:

1. A coding method for coding a digital television signal of an interlaced type used in a television system, said coding method comprising the steps of:

(a) storing a plurality of fields of the interlaced digital television signal as three-dimensional blocks in a memory, each block including a plurality of picture elements formed from a combined plurality of fields image data, picture elements in a horizontal direction of each of a plurality of fields for each block being primary components, picture elements in a vertical direction of each of a plurality of fields for each block being secondary components, picture elements of a plurality of fields for each block having nearly coincidental two-dimensional spatial position being tertiary components;

(b) electronically executing an orthogonal transformation on each constructed three-dimensional block to thereby obtain coefficients to produce a transformation signal;

(c) using a single encoding process to encode the coefficients in the transformation signal to produce a television data signal, thereby reducing redundant information in the transformation signal, without judging whether the digital television signal is a moving or stationary image; and (d) transmitting the television data signal.

2. The coding method of claim 1, wherein said orthogonal transformation is performed using a DCT (Discrete Cosine Transform).

3. A coding method for coding a digital television signal of an interlaced type used in a television system, said coding method comprising the steps of:

(a) storing a plurality of fields of the interlaced digital television signal as two-dimensional blocks in a memory, each block including a plurality of picture elements, for each field;

(b) rearranging the two-dimensional blocks of a plurality of fields which have nearly coincidental two-dimensional spatial position into a three-dimensional block within the memory;

(c) electronically executing an orthogonal transformation on the three-dimensional block to thereby to obtain coefficients to produce a transformation signal;

(d) using a single encoding process to encode the coefficients in the transformation signal to produce a television data signal, thereby reducing redundant information in the transformation signal, without judging whether the digital television signal is a moving or stationary image; and (e) transmitting the television data signal.

4. A coding method for coding digital television signal of an interlaced type used in a television system, said coding method comprising the steps of:

(a) storing a plurality of fields the interlaced digital television signal in a memory by formatting the interlaced digital television signal in at least a temporal direction to thereby construct a plurality of blocks;

(b) electronically executing an orthogonal transformation on each of the plurality of constructed blocks to thereby obtain coefficients to produce a transformation signal; and (c) quantizing the coefficients of the transformation signal;

(d) using a single encoding process to encode the quantized coefficients in the transformation signal to produce a television data signal, thereby reducing redundant information in the transformation signal, without judging whether the digital television signal is a moving or stationary image wherein coefficients whose values are zero when the formatted signal corresponds to a still picture are weighted prior to quantizing; and (e) transmitting the television data signal.

5. The coding method of claim 4, wherein said orthogonal transformation is performed using a DCT (Discrete Cosine Transform).

6. The coding method of claim 5, wherein said interlaced type is a 2:1 interlaced type, and when a digital television signal of 2N fields (N: being a natural number) is orthogonally transformed using DCT to thereby obtain zero-th to (2N−1)-th coefficients, 2m-th coefficients (m: being a natural number less than N) are weighted and quantized.

7. A coding method for coding a digital television signal of an interlaced type used in a television system, said coding method comprising the steps of:

(a) storing a plurality of fields of the interlaced digital television signal as three-dimensional blocks in a memory, each block including a plurality of picture elements formed from a combined plurality of picture elements formed from a combined plurality of fields of image data, picture elements in a horizontal direction of each of a plurality of fields for each block being primary components, picture elements in a vertical direction of each of a plurality of fields for each block being secondary components, picture elements of a plurality of fields for each block having nearly coincidental two-dimensional spatial position being tertiary components;

(b) electronically executing an orthogonal transformation on each constructed three-dimensional block to thereby obtain coefficients to produce a transformation signal;

(c) quantizing the coefficients of the transformation signal;

(d) using a single encoding process to encode the quantized coefficients in the transformation signal to produce a television data signal, thereby reducing redundant information in the transformation signal, without judging whether the digital television signal is a moving or stationary image wherein coefficients whose value are zero when the three-dimensional constructed block corresponds to a still picture are weighted prior to quantizing; and (e) transmitting the television data signal.

8. A coding method for coding a digital television signal of an interlaced type used in a television system, said coding method comprising the steps of:

(a) storing a plurality of fields of the interlaced digital television signal in a memory by formatting the interlaced digital television signal in at least a temporal direction to thereby construct a plurality of blocks;

(b) electronically executing an orthogonal transformation on the plurality of constructed block to thereby obtain coefficients to produce a transformation signal;

(c) weighing and quantizing the coefficients of the transformation signal;

(d) using a single encoding process to encode the quantized data to produce a television data signal, thereby reducing redundant information in the transformation signal, without judging whether the digital television signal is a moving or stationary image wherein coefficients whose values are zero when the formatted signal corresponds to a still picture are weighted at a lower rate than coefficients whose values are not zero when the formatted signal corresponds to a still picture; and (e) transmitting the television data signal.

9. The coding method of claim 8, wherein said orthogonal transformation is performed using a DCT (Discrete Cosine Transform).

10. The coding method of claim 9, wherein said interlaced type is a 2:1 interlaced type, and when a digital television signal of 2N fields (N: being a natural number) is orthogonally transferred using DCT to thereby obtain zero-th to (2N−1)-th coefficients, 2m-th coefficients (m: being a natural number less than N) are weighted at a lower rate than (2k−1)-th coefficients (k: being a natural number not larger than N).

11. A coding method for coding a digital television signal of an interlaced type used in a television system, said coding method comprising the steps of:

(a) storing a plurality of fields of the interlaced digital television signal as three-dimensional blocks in a memory, each block including a plurality of picture elements formed from a combined plurality of fields of image data, picture elements in a horizontal direction of each of a plurality of fields for each block being primary components, picture elements in a vertical direction of each of a plurality of fields for each block being secondary components, picture elements of a plurality of fields for each block having nearly coincidental two-dimensional spatial position being tertiary components;

(b) electronically executing an orthogonal transformation on each constructed three-dimensional block to thereby obtain coefficients to produce a transformation signal;

(c) weighing and quantizing the coefficients of the transformation signal;

(d) using a single encoding process to encode the quantized data to produce a television data signal for transmission, thereby reducing redundant information in the transformation signal, without judging whether the digital television signal is a moving or stationary image wherein coefficients whose values are zero when the three-dimensional constructed block corresponds to a still picture are weighted at a lower rate than coefficients whose values are not zero when the constructed block corresponds to a still picture; and (e) transmitting the television data signal.

12. A coding method for coding a digital television signal of an interlaced type used in a television system, said coding method comprising the steps of:

a first step of storing odd and even fields of the interlaced digital television signal in a memory;

a second step of rearranging picture elements, stored in the memory, in only a vertical direction in each field to thereby make a spatial position of picture elements in odd-number fields and in even-number fields the same;

a third step of executing a same encoding operation, without judging whether the digital television signal is a moving or stationary image, on picture elements of a plurality of fields which have the same spatial position to produce a television data signal, thereby reducing redundant information within the memory, by encoding picture elements of a plurality of fields having a same spatial position such that spatial positions in odd-number and even-number fields coincide; and a fourth step of transmitting the television data signal.

13. The coding method of claim 12, wherein said second step comprises the following steps:

inserting picture elements with zero level at every other picture element in the vertical direction to double the number of picture elements;

passing data, after the zero picture element are inserted, through an interpolation filter; and removing picture elements to thereby make the spatial position of picture elements in the odd-number fields and in the even-number fields the same.

14. A coding method for coding a digital television signal of an interlace type used in a television system, said coding method comprising the steps of:

(a) inputting an interlaced digital television signal having odd and even fields;

(b) storing the interlaced digital television signal in a memory;

(c) rearranging picture elements, stored in the memory, in a vertical direction in each field to thereby make a spatial position of picture elements in odd-number fields and in even-number fields the same;

(d) rearranging contents of the memory to construct three-dimensional blocks, each block including a plurality of picture elements formed from a combined plurality of fields of image data, picture elements in a horizontal direction of each of a plurality of fields for each block being primary components, picture elements in the vertical direction of each of a plurality of fields for each block being secondary components, picture elements of a plurality of fields for each block having nearly coincidental two-dimensional spatial position being tertiary components;

(e) electronically executing an orthogonal transformation on each constructed three-dimensional block to thereby obtain coefficients to produce a transformation signal;

(f) using a single encoding process to encode the coefficients in the transformation signal to produce a television data signal, thereby reducing redundant information in the transformation signal, without judging whether the digital television signal is a moving or stationary image; and (g) transmitting the television data signal.

15. A coding apparatus for coding a digital television signal of an interlaced type used in a television system, said coding apparatus comprising:

means for inputting the interlaced digital television signal in a plurality of fields;

a memory to store the inputted interlaced digital television signal;

means for rearranging contents of said memory to construct three-dimensional blocks, each block including a plurality of picture elements formed from a combined plurality of fields of image data, picture elements in a horizontal direction of each of a plurality of fields for each block being primary components, picture elements in a vertical direction of each of a plurality of fields for each block being secondary components, picture elements of a plurality of fields for each block having nearly coincidental two-dimensional spatial position being tertiary components;

means for performing orthogonal transformation on each constructed three-dimensional block to thereby obtain coefficients to produce a transformation signal;

means for encoding the coefficients in the transformation signal to produce a television data signal by using a single encoding process, thereby reducing redundant information without judging whether the digital television signal is a moving or stationary image; and means for transmitting the television data signal.

16. A coding apparatus for coding a digital television signal of an interlaced type used in a television system, said coding apparatus comprising:

means for inputting the interlaced digital television signal in a plurality of fields;

a memory to store the interlaced digital television signal;

means for arranging picture elements in a vertical direction in each field to make a spatial position of picture elements in odd-number fields and in even-number fields the same;

means for rearranging contents of said memory to construct three-dimensional blocks, each block including a plurality of picture elements formed from a combined plurality of fields of image data, picture elements in a horizontal direction of each of a plurality of fields for each block being primary components, picture elements in a vertical direction of each of a plurality of fields for each block being secondary components, picture elements of a plurality of fields for each block having nearly coincidental two-dimensional spatial position being tertiary components;

means for performing orthogonal transformation of each constructed three-dimensional block to thereby obtain coefficients to produce a transformation signal;

means for encoding the coefficients in the transformation signal to produce a television data signal by using a single encoding process, thereby reducing redundant information in the transformation signal, without judging whether the digital television signal is a moving or stationary image; and means for transmitting the television data signal.

17. A coding and decoding apparatus for coding a digital television signal of an interlaced type and for decoding coded data to thereby obtain the digital signal used in a television system, said coding and decoding apparatus comprising:

means for inputting the interlaced digital television signal in a plurality of fields;

a memory to store the inputted interlaced digital television signal in a plurality of fields;

means for rearranging contents of said memory to construct three-dimensional blocks, each block including a plurality of picture elements formed from a combined plurality of fields of image data, picture elements in a horizontal direction of each of a plurality of fields for each block being primary components, picture elements in a vertical direction of each of a plurality of fields for each block being secondary components, picture elements of a plurality of fields for each block having nearly coincidental two-dimensional spatial position being tertiary components;

means for performing orthogonal transformation on each constructed three-dimensional block to thereby obtain coefficients to produce a transformation signal;

means for encoding the coefficients in the transformation signal to produce a television data signal for transmission by using a single encoding process, thereby reducing redundant information in the transformation signal, without judging whether the digital television is a moving or stationary image;

means for transmitting the television data signal;

means for decoding the television data signal to thereby obtain coefficients;

means for performing inverse orthogonal transformation on the obtained coefficients to thereby obtain the three-dimensional blocks; and means for synthesizing the obtained three-dimensional blocks to thereby obtain the original digital television signal.

* * * * *